United States Patent
Hayashi et al.

(10) Patent No.: US 8,116,558 B2
(45) Date of Patent: Feb. 14, 2012

(54) THREE-DIMENSIONAL SHAPE DATA POSITION MATCHING METHOD AND DEVICE

(75) Inventors: Toshihiro Hayashi, Tokyo (JP); Yukihiro Kawano, Tokyo (JP); Hideo Terada, Tokyo (JP)

(73) Assignee: IHI Corporation, Tokyo (JP)

( * ) Notice: Subject to any disclaimer, the term of this patent is extended or adjusted under 35 U.S.C. 154(b) by 918 days.

(21) Appl. No.: 12/096,851

(22) PCT Filed: Dec. 15, 2006

(86) PCT No.: PCT/JP2006/325047
§ 371 (c)(1),
(2), (4) Date: Jun. 10, 2008

(87) PCT Pub. No.: WO2007/069724
PCT Pub. Date: Jun. 21, 2007

(65) Prior Publication Data
US 2009/0202155 A1  Aug. 13, 2009

(30) Foreign Application Priority Data
Dec. 16, 2005 (JP) .................. 2005-363302

(51) Int. Cl.
*G06K 9/00* (2006.01)

(52) U.S. Cl. .................. 382/154; 382/291; 345/419

(58) Field of Classification Search .................. 382/106, 382/154, 203, 291, 294, 296; 345/419, 420, 345/424
See application file for complete search history.

(56) References Cited

U.S. PATENT DOCUMENTS

| 5,123,084 A | 6/1992 | Prevost et al. |
| 5,583,975 A | 12/1996 | Naka et al. |

(Continued)

FOREIGN PATENT DOCUMENTS

JP   63-186308   8/1988

(Continued)

OTHER PUBLICATIONS

Nuechter, Andreas et al., "6D SLAM with an Application in Autonomous Mine Mapping," IEEE 2004 International Conference on Robotics and Automation, Apr. 2004.

(Continued)

*Primary Examiner* — John Strege
(74) *Attorney, Agent, or Firm* — Griffin & Szipl, P.C.

(57) ABSTRACT

A three-dimensional shape data position matching method for measuring a static three-dimensional shape from a plurality of measuring positions, and for combining and position matching the distance data thereof, including: a data inputting step S1 for inputting, into a computer, coordinate values on a three-dimensional shape at a new measuring position; a model structuring step S4 for structuring an environment model that partitions a spatial region in which the three-dimensional shape exists, into a plurality of voxels formed from rectangular solids, of which the boundary surfaces are mutually perpendicular, and stores the positions of the individual voxels; a matching step S5 for setting and recording a representative point and an error distribution thereof, within the voxel corresponding to the coordinate value; a fine matching step S7 for position matching so as to minimize the summation of the distances between adjacent error distributions by rotating and translating a new measured data and error distribution, or rotating and translating an environment model for a new measuring position, relative to an environment model for a previous measuring position; and an outputting step for outputting, to an outputting device, the voxel position, the representative point, and the error distribution.

19 Claims, 16 Drawing Sheets

U.S. PATENT DOCUMENTS

| | | | |
|---|---|---|---|
| 5,689,629 | A | 11/1997 | Lee |
| 5,724,493 | A | 3/1998 | Hosoya et al. |
| 6,026,189 | A | 2/2000 | Greenspan |
| 6,064,942 | A | 5/2000 | Johnson et al. |
| 6,256,036 | B1 | 7/2001 | Matsumoto |
| 6,363,169 | B1 | 3/2002 | Ritter et al. |
| 6,476,803 | B1 * | 11/2002 | Zhang et al. ............ 345/419 |
| 6,809,728 | B2 | 10/2004 | Terauchi et al. |
| 6,914,601 | B2 | 7/2005 | Fujiwara et al. |
| 7,120,519 | B2 | 10/2006 | Okabayashi et al. |
| 7,317,456 | B1 | 1/2008 | Lee |
| 7,653,235 | B2 | 1/2010 | Mylaraswamy et al. |
| 7,843,512 | B2 | 11/2010 | Mohamed et al. |
| 2005/0068317 | A1 * | 3/2005 | Amakai ............ 345/419 |
| 2005/0226331 | A1 | 10/2005 | Mohamed et al. |
| 2006/0017720 | A1 | 1/2006 | Li |
| 2007/0276225 | A1 * | 11/2007 | Kaufman et al. ........ 600/416 |

FOREIGN PATENT DOCUMENTS

| | | |
|---|---|---|
| JP | 3-170345 A | 7/1991 |
| JP | 5-314244 B2 | 11/1993 |
| JP | 06-018221 | 1/1994 |
| JP | 9-81788 | 3/1997 |
| JP | 09-229648 | 9/1997 |
| JP | 2000-113193 | 4/2000 |
| JP | 2001-022939 | 1/2001 |
| JP | 3170345 | 3/2001 |
| JP | 2001-236522 | 8/2001 |
| JP | 2003-015739 | 1/2003 |
| JP | 2003-296755 | 10/2003 |
| JP | 2004-521423 | 7/2004 |
| JP | 2004-521423 A | 7/2004 |
| JP | 2005-037379 | 2/2005 |
| WO | 02/073540 A1 | 9/2002 |

OTHER PUBLICATIONS

Thrun, Sebastian, "Learning Occupancy Grid Maps with Forward Sensor Models," School of Computer Science, Carnegie Melon Univeristy, pp. 1-28, 2003.

Kiyohide, Sekimoto, et al. "Development of 3D Laser Radar for Traffic Monitoring," Ishikawajima-Harima Engineering Review, vol. 43, No. 4, (Jul. 2003), pp. 114-117.

Masuda, Takeshi et al., "A Survey of Shape Model Generation from Multiple Range Images," Joho Shori Gakkai Kenkyu Hokoku, vol. 2004, No. 113, 2004, pp. 1-13.

Besl, Paul et al., "A Method for Registration of 3-D Shapes," IEEE Transactions on Pattern Analysis and Machine Intelligence, vol. 14, No. 2, Feb. 1992, pp. 239-256.

International Search Report issued in corresponding application No. PCT/JP2006/325047, completed Feb. 19, 2007 and mailed Feb. 27, 2007.

Office Action issued in co-pending U.S. Appl. No. 12/096,871, dated Mar. 29, 2011.

Office Action issued in co-pending related U.S. Appl. No. 12/096,830 on Aug. 8, 2011.

* cited by examiner

ENVIRONMENT MODEL
(REPRESENTATIVE POINT
+ ERROR DISTRIBUTION))

FINE POSITION MATCHING

TAKE INTO ACCOUNT
ERROR DISTRIBUTION
FOR MEASURED DATA

THREE-DIMENSIONAL SHAPE DATA POSITION MATCHING METHOD AND DEVICE

This is a National Phase Application in the United States of International Patent Application No. PCT/JP2006/325047 filed Dec. 15, 2006, which claims priority on Japanese Patent Application No. 363302/2005, filed Dec. 16, 2005. The entire disclosures of the above patent applications are hereby incorporated by reference.

BACKGROUND OF THE INVENTION

1. Technical Field of the Invention

The present invention relates to a three-dimensional shape data position matching method and device for measuring a non-moving three-dimensional shape from a plurality of measuring positions, and for combining and position matching the distance data thereof.

2. Description of the Related Art

In the present invention, the estimation of geometric positional relationships of a plurality of range images that are obtained by measuring a non-moving three-dimensional shape from multiple observation points is termed "position matching."

Three-dimensional shape measuring technologies are becoming more prevalent, and three-dimensional shape data is used in a variety of application fields, such as measuring shapes inmachine components/workpieces, self-position identification in mobile robots, and topographical and structural measurements, and the like.

When measuring the three-dimensional shape of an object and restoring that three-dimensional shape, it is possible to acquire surface data of the surface facing the observation point (measurement position) when measuring from a single observation point, but not possible to measure the back surface of the object. Because of this, reproducing a three-dimensional shape requires measurement from a plurality of observation points, and requires precise position matching of the measurement results.

Position matching of data acquired from a plurality of observation points requires explicit definition of the positional relationship between the observation point and the measured object. Methods for obtaining the positional relationships between the observation point and the object to be measured include methods wherein the object is placed on a stage and rotated, and methods wherein the observation point is held on an arm, or the like, that has a mechanical linkage, but in both cases the precision of the positional relationships is limited. Additionally, even assuming precision were adequate, there is still a limit to the size of the object to be measured.

Given this, as means wherein the positional relationship is not affected and wherein there is also no limit to the size of the object to be measured, various means have been proposed wherein measured data obtained earlier and measured data obtained later are compared and matched.

Of these, when a corresponding point is already known, this can be solved easily as a problem of minimizing the square error through rotation and translation. However, typically corresponding points are not known in advance.

Matching using invariant features, the direct method, and ICP algorithms have been proposed (in, for example, non-patent documents 1 and 2) as means for position matching when corresponding points are not known in advance.

In "matching using invariant features," matching of two data are performed using local invariant feature points in the shape (such as derivative features).

In the "direct method," an optical flow in a two-dimensional image is calculated for a three-dimensional image.

In the "ICP (Iterative Closest Points) Algorithm," the closest points in data measured later relative to data that has been measured earlier are calculated, and rotations and translations are performed to find a solution wherein the state having the minimum summation of distances is set as the matching state.

Additionally, non-patent document 3 is disclosed as a technology relating to the present invention.

(Non-Patent Document 1)
Takeshi Masuda, et al, "Shape Model Generation from Multiple Range Images"

(Non-Patent Document 2)
Paul J. Besl, "A Method for Registration of 3-D Shapes," IEEE Transactions of Pattern Analysis and Mechanical Intelligence, Vol. 14, No. 2, February 1992

(Non-patent Document 3)
Sekimoto Kiyohide, et al., "Development of a Three-Dimensional Laser Radar," Ishikawaj ima-Harima Engineering Review, vol. 43, No. 4 (2003-7)

When range sensors are used, such as the three-dimensional laser radar, the measurement points on the three-dimensional object being measured form a set of points that are dispersed in the horizontal direction and in the vertical direction. When it comes to the spacing of this point set, if the distance from the measurement point is, for example, 50 m, then the spacing of the points to be measured will reach, for example, about 315 mm in the horizontal direction and about 525 mm in the vertical direction.

Furthermore, when measuring a non-moving three-dimensional shape from a plurality of measurement points, then normally the positions of the points to be measured are different for each measurement point with a range sensor such as a three-dimensional laser radar.

Moreover, with this type of range sensor, typically there is error of about ±20 cm in the measured distances.

Consequently, there are the following constraint conditions A through C when a range sensor such as a three-dimensional laser radar is used.

Condition A: The number of points in the measured data be low (for example, 166×50 points in one frame).

Condition B: There is error in the measured data (for example, about ±20 cm in the measured distances).

Condition C: The measured data is not limited to measuring the same measurement point.

That is, the range data that is obtained is a set of points that are dispersed in the horizontal direction and the vertical direction. Since the measured position is different for each measurement, there are not corresponding points, and measured distance includes a relatively large error.

When this type of range data is processed in the "matching using invariant features" or "direct method," the point set is dispersed, the number of measurement points is low, there are no corresponding points, and there is a large amount of measurement error, so that it is essentially impossible to perform position matching accurately.

Additionally, although in theory it is possible to perform point set position matching using the ICP algorithm, there are the following problems:

(1) Cumulative Error
The ICP algorithm is the means for superimposing two distance data, and even though the earlier data and the later data are compared repetitively and the differences are integrated, there are essentially no corresponding points, so the error is cumulative.

(2) High Calculation Amount

The ICP algorithm is an iterative calculation, so that the calculation amount is large. That is, the ICP algorithm requires searching for model data corresponding to each of the data points in the measured data, so the calculation amount increases as the numbers of model data points and measured data points increase. Specifically, if the number of model data points is M and the number of measured data points is N, then the calculation order for the total search time is O (M×N).

(3) Not Suitable if there are Few Measurement Points

The ICP algorithm is used for dense range data, so when the point set is dispersed and spatially sparse, the algorithm will converge to incorrect results.

SUMMARY OF THE INVENTION

The present invention was invented to resolve the problems described above. That is, the object of the present invention is to provide a three-dimensional shape data position matching method and device capable of accurate position matching without cumulative error and with low calculation amount, even in a case where the range data obtained by measuring a static three-dimensional shape from a plurality of measured points is a spatially dispersed point set, the positions for each measurement are different, so that there are no corresponding points, and there is a relatively large amount of error included.

The present invention provides a three-dimensional shape data position matching method for measuring a static three-dimensional shape from a plurality of measuring positions, and for combining and positionally matching the distance data thereof, comprising: a data inputting step for inputting, into a computer, coordinate values on a three-dimensional shape at a new measuring position; a model structuring step for structuring an environment model that partitions a spatial region in which the three-dimensional shape exists into a plurality of voxels formed from rectangular solids, of which the boundary surfaces are mutually perpendicular, and storing the positions of the individual voxels; a matching step for setting, and recording, a representative point, and an error distribution thereof, within the voxel corresponding to the coordinate value; a fine matching step for position matching so as to minimize an evaluation value (for example, the summation of the distances) relating to the distance between adjacent error distributions by rotating and translating a new measured data and error distribution, or rotating and translating an environment model for a new measuring position, relative to an environment model for a previous measuring position; and an outputting step for outputting, to an outputting device, a voxel position, a representative point, and an error distribution.

Note that instead of the summation of the distances, the evaluation value in regards to the distance may be the average of the distances, the summation of squares of the distances, or the maximum value for the distances, or may be another appropriate evaluation value.

In the matching step in a preferred embodiment as set forth in the present invention, a probability value indicating the probability of the existence of an object within the voxel is also set within the voxel, in addition to a representative point and an error distribution, and stored.

Additionally, prior to the fine matching step, there is a rough matching step for position matching by rotating and translating a new measured data and error distribution relative to an environment model for an earlier measuring position to minimize an evaluation value (such as the summation of the distances) regarding the distances between measured data and adjacent voxels, and between error distributions and adjacent voxels, the voxels having representative points, or rotating and translating an environment model for a new measuring position relative to an environment model for an earlier measuring position to minimize an evaluation value (such as the summation of the distances) regarding the distances between voxels having representative points.

Note that instead of the summation of the distances, the evaluation value in regards to the distance between measured data and adjacent voxels, and between error distributions and adjacent voxels, the voxels having representative points may be the average of the distances, the summation of squares of the distances, or the maximum value for the distances, or may be another appropriate evaluation value.

Moreover, the evaluation value regarding the distances between voxels having representative points may be an average of the distances, the summation of squares of the distances, or the maximum value of the distances, or another appropriate evaluation value, instead of the summation of the distances.

Moreover, prior to the fine matching step, there is a rough matching step for position matching by rotating and translating a new measured data and error distribution relative to an environment model for an earlier measuring position to maximize an evaluation value (such as the summation of the probability values) regarding the probability values of voxels having representative points adjacent to measured data and error distributions, or rotating and translating an environment model for a new measuring position relative to an environment model for an earlier measuring position to minimize an evaluation value (such as the summation of the differences of probability values) regarding the differences in probability values of adjacent voxels.

Note that instead of the summation of the probability values, the evaluation value in regards to the probability value of a voxel having a representative point adjacent to a measured data and an error distribution may be the average of the probability values, the summation of squares of the probability values, or the minimum value for the probability values, or may be another appropriate evaluation value.

Additionally, instead of the summation of the differences of the probability values, the evaluation value relative to the difference in probability values of adjacent voxels may be the summation of squares of differences of probability values, or the maximum value for the difference of probability values, or may be another appropriate evaluation value.

In addition, after the data inputting step, there is a search scope limiting step for limiting the scope of checking through obtaining the current measuring position through inference from a change in the measuring position of the past, or from a sensor that is capable of obtaining the current measuring position, or through the use of a reflective strength value instead of just the distance value of the measured data.

Additionally, in the model structuring step, the largest voxel is set to a size corresponding to the minimum required resolution, and when a plurality of measured points exists within a single voxel, the voxel is further partitioned hierarchically into a plurality of voxels so that only a single measured point exists within a single voxel.

Furthermore, after the fine matching step, there is a model updating step for updating the environment model, wherein a voxel is retrieved corresponding to the coordinate value of a newly inputted measured point; and assuming no object exists between the origin and the measured point, the representative point and error distribution in a voxel positioned therebetween are reset or eliminated.

Furthermore, after the fine matching step, there is a model updating step for updating the environment model, wherein a voxel is retrieved corresponding to the coordinate value of a newly inputted measured point; and when there is no representative point within the voxel, the coordinate value and the error distribution are set as the representative point coordinate value and error distribution.

Furthermore, after the fine matching step, there is a model updating step for updating the environment model, wherein a voxel is retrieved corresponding to the coordinate value of a newly inputted measured point; when there is a representative point that has already been set within the voxel, a newly obtained error distribution and the error distribution already set within the voxel are compared; if the error distributions are mutually overlapping, a new error distribution and a new representative point are set from both of the error distributions, or from both of the error distributions and the representative point already set within the voxel and the coordinate values of the measured point newly inputted; and if the error distributions are not mutually overlapping, then the voxel is further partitioned hierarchically into a plurality of voxels so that only a single representative point exists within a single voxel. An oct tree or a K-D tree is used for the voxel partitioning.

In the model updating step, the newly obtained error distribution and the error distribution that has already been set within the voxel are compared, if the error distributions are mutually overlapping, and the new representative point has moved into another voxel as the result of setting a new error distribution and a new representative point from both of the error distributions, then: if there is no representative point in the another voxel, the new error distribution and new representative point are set into the another voxel; and if there is a representative point that has already been set in the another voxel, then the new error distribution and the error distribution that has already been set into the another voxel are compared; (A) if the error distributions are mutually overlapping, then a new error distribution and a new representative point are reset from both error distributions, or from both error distributions and the representative point that has already been set within the voxel and the coordinate values for the newly inputted measured point; or (B) if the error distributions are not mutually overlapping, the voxel is further partitioned hierarchically into a plurality of voxels so that only a single representative point exists within a single voxel.

In another embodiment of the present invention, there is, after the fine matching step, a model updating step for updating the environment model, wherein: a new representative point and error distribution are obtained and reset through a Kalman filter from the newly inputted measured point coordinate value and the error distribution thereof, and the representative point and the error distribution thereof that have already been set in the voxel.

In the fine matching step, a new measured data and error distribution are rotated and translated relative to the environment model for the previous measuring position, or an environment model for a new measuring position is rotated and translated relative to an environment model for an earlier measuring position, in order to maximize the evaluation value (such as the multiplication of the degree of coincidence) relative to the degree of coincidence established through maximum likelihood estimates based on the distance between adjacent error distributions, instead of position matching so as to minimize an evaluation value for the distance between adjacent error distributions.

The equation for calculating the evaluation value relative to the degree of coincidence is expressed in the following Equation 1:

$$EM = \prod_{j=1}^{N} \{\omega(j)EM(i, j)\} \quad \text{(Equation 1)}$$

In this equation, a correlation is established between the measured points j and the representative points i in the environment model, where the probability of obtaining measured data that is the measured point j is given by EM (i, j), where $\omega(j)$ is 1 if there is a representative point that corresponds to the measured point j within the environment model, and 0 otherwise.

Additionally, the present invention provides a three-dimensional shape data position matching device for measuring a static three-dimensional shape from a plurality of measuring positions, and for combining and positional matching the distance data thereof, comprising: a data inputting device for inputting, into a computer, coordinate values on a three-dimensional shape; a model structuring device for structuring an environment model that partitions a spatial region in which the three-dimensional shape exists into a plurality of voxels formed from rectangular solids, of which the boundary surfaces are mutually perpendicular, and storing the positions of the individual voxels; a matching device for setting, and recording, a representative point, and an error distribution thereof, within a voxel corresponding to a coordinate value; and a data transmitting device for outputting, to an outputting device, the voxel positions, representative points, and error distributions; wherein: an environment model for a new measuring position is rotated and translated relative to an environment model for a previous measuring position to perform position matching so as to minimize an evaluation value (such as the summation of distances) related to the distance between adjacent error distributions.

In the matching device, a probability value indicating the probability of the existence of an object within the voxel is also set within the voxel, in addition to a representative point and an error distribution, and stored.

Prior to the position matching (the fine matching step), the three-dimensional shape data position matching device performs a rough matching step for position matching by rotating and translating a new measured data and error distribution relative to an environment model for an earlier measuring position to minimize an evaluation value (such as the summation of the distances) regarding the distances between measured data and adjacent voxels, and between error distributions and adjacent voxels, the voxels having representative points, or rotating and translating an environment model for a new measured position relative to an environment model for an earlier measuring position to minimize an evaluation value (such as the summation of the distances) regarding the distances between voxels having representative points.

Prior to the fine matching step, the three-dimensional shape data position matching device performs a rough matching step for position matching by rotating and translating a new measured data and error distribution relative to an environment model relative to an earlier measuring position to maximize an evaluation value (such as the summation of the probability values) regarding the probability values of voxels having representative points adjacent to measured data and error distributions, or rotating and translating an environment model for a new measuring position relative to an environment model for an earlier measuring position to minimize an evaluation value (such as the summation of the differences of probability values) regarding the differences in probability values of adjacent voxels.

After the data inputting step, the three-dimensional shape data position matching device performs a search scope limiting step for limiting the scope of checking through obtaining the current measuring position through inference from a change in the measuring position of the past, or from a sensor that is capable of obtaining the current measuring position, or through the use of a reflective strength value in addition to the distance value of the measured data.

In the fine matching step, the three-dimensional shape data position matching device treats the case (error distributions) as a single measured point if error distributions intersect, and calculates the distance between error distributions by multiplying the distance values of this case by a weight calculated from the degrees of coincidence of the distributions.

The model structuring device sets the largest voxel to a size corresponding to the minimum required resolution, and when a plurality of measured points exists within a single voxel, further partitions hierarchically the voxel into a plurality of voxels so that only a single measured point exists within a single voxel.

After the fine matching step, the three-dimensional shape data position matching device performs a model updating step for updating the environment model, wherein a voxel is retrieved corresponding to the coordinate value of a newly inputted measured point; and as the case wherein no object exists between the origin and the measured point, reset or eliminate the representative point and error distribution in a voxel positioned therebetween.

The three-dimensional shape data position matching device comprises a model updating device for updating the environment model after the fine matching step: wherein the model updating device: retrieves a voxel corresponding to the coordinate value of a newly inputted measured point; and when there is no representative point within the voxel, sets the coordinate value and the error distribution as the representative point coordinate value and error distribution.

The three-dimensional shape data position matching device comprises a model updating device for updating the environment model after the fine matching step: wherein the model updating device: retrieves a voxel corresponding to the coordinate value of a newly inputted measured point; when there is a representative point that has already been set within the voxel, compares a newly obtained error distribution and the error distribution already set within the voxel; if the error distributions are mutually overlapping, sets a new error distribution and a new representative point from both of the error distributions, or from both of the error distributions and the representative point already set within the voxel and the coordinate values of the measured point newly inputted; and if the error distributions are not mutually overlapping, then further partitions hierarchically the voxel into a plurality of voxels so that only a single representative point exists within a single voxel.

The model updating device compares the newly obtained error distribution and the error distribution that has already been set within the voxel; if the error distributions are mutually overlapping, and the new representative point has moved into another voxel as the result of setting a new error distribution and a new representative point from both of the error distributions, if there is no representative point in the another voxel, then sets the new error distribution and new representative point into the another voxel, if there is a representative point that has already been set in the another voxel, then compares the new error distribution and the error distribution that has already been set into the another voxel; and (A) if the error distributions are mutually overlapping, then resets a new error distribution and a new representative point from both error distributions, or from both error distributions and the representative point that has already been set within the voxel and the coordinate values for the newly inputted measured point; or (B) if the error distributions are not mutually overlapping, further partitions hierarchically the voxel into a plurality of voxels so that only a single representative point exists within a single voxel.

In another embodiment as set forth in the present invention, the three-dimensional shape data position matching device comprises a model updating device for updating the environment model after the fine matching step: wherein the model updating device obtains and resets a new representative point and error distribution through a Kalman filter from the newly inputted measured point coordinate value and the error distribution thereof, and the representative point and the error distribution thereof that have already been set in the voxel.

In the fine matching step, the three-dimensional shape data position matching device rotates and translates a new measured data and error distribution relative to the environment model for the previous measuring position, or rotates and translates an environment model for a new measuring position relative to an environment model for an earlier measuring position, in order to maximize an evaluation value (such as the multiplication of the degree of coincidence) regarding the degree of coincidence established through maximum likelihood estimates based on the distance between adjacent error distributions, instead of position matching so as to minimize an evaluation value (such as the multiplication of the degree of coincidence) regarding the distance between adjacent error distributions. In this case, the equation for calculating the evaluation value relative to the degree of coincidence is expressed in the equation (1):

The method and device as set forth in the present invention, as described above, by partitioning a spatial region, in which a three-dimensional shape exists, into a plurality of voxels and recording the position of each voxel, even when the object to be measured is large, the data size can be kept small in proportion to the number of voxels.

Additionally, a representative point and an error distribution thereof are set and recorded within a voxel corresponding to a coordinate value, enabling the display of data at greater than the voxel resolution.

Additionally, setting and storing a probability value that indicates the probability of the existence of an object within the voxel enables an easy determination as to the probability value for the voxel without having to find a voxel having a representative point that represents whether or not an object exists in the voxel, and without having to recalculate from the error distribution, even when the error distribution is wider than the voxel having the representative point, thus making it possible to suppress the search time.

In addition, obtaining the current measuring position through inference from a change in the measuring position of the past, or from a sensor that is capable of obtaining the current measuring position, or through the use of a reflective strength value instead of just the distance value of the measured data limits the scope of checking, thereby enabling the search time to be suppressed.

Additionally, in a rough matching step, position matching can be performed by rotating and translating a new measured data and error distribution relative to an environment model for an earlier measuring position to minimize an evaluation value (such as the summation of the distances) regarding the distances between measured data and adjacent voxels, and between error distributions and adjacent voxels, the voxels having representative points, or rotating and translating an environment model for a new measuring position relative to an environment model for an earlier measuring position to minimize an evaluation value (such as the summation of the distances) regarding the distances between voxels having representative points, or, by performing position matching by rotating and translating a new measured data and error distribution relative to an environment model for an earlier measuring position to maximize an evaluation value (such as the summation of the probability values) regarding the probability values of voxels having representative points adjacent to measured data and error distributions, or rotating and translating an environment model for a new measuring position relative to an environment model for an earlier measuring position to minimize an evaluation value (such as the summation of the differences in probability values) regarding the differences in probability values of adjacent voxels, making it possible to perform position matching, to each other, of voxels having representative points, doing so in a short period of time, while preventing cumulative error.

Additionally, for the environment model of the previous measuring position, in the case of performing position matching by rotating and translating the environment model for the new measuring position relative to an environment model for an earlier measuring position so as to minimize an evaluation value (such as the summation of differences of probability values) pertaining to the difference in probability values of adjacent voxels, because the information wherein no object exists is also taken into account, thus the accuracy is improved.

Following this, in a fine matching step, position matching is performed so as to minimize the summation of the distances between adjacent error distributions by rotating and translating a new measured data and error distribution, or rotating and translating an environment model for a new measuring position, relative to an environment model for a previous measuring position, so fine position matching of error distributions to each other can be performed in a short period of time.

Because of this, by using the model data that is obtained by integrating measured data that is obtained sequentially, into the environment model of the present invention, the position orientation that matches best the measured data can be calculated, and cumulative error can be prevented.

Additionally, when the environment model of the present invention is used, the number of points that have a single representative point within a voxel is reduced, which can reduce the calculation amount. In other words, in the data structure proposed in the present invention, because a single representative point exists within a voxel, the calculation order for searching for a model point corresponding to a measured point can be put to 1, and thus the overall calculation order can be reduced to O (N).

Additionally, notwithstanding the reduction in the number of points, the environment model of the present invention maintains accuracy by creating a hierarchy of voxels and error distributions of representative points.

Additionally, while the conventional ICP algorithm outputs erroneous results for sparse data, the environment model of the present invention has representative points and error distributions within voxels, and thus position matching is possible for sparse data.

Consequently, the method and device as set forth in the present invention enables shapes to be restored in high-resolution while preventing cumulative error, even with sparse data, in restoring three-dimensional shape information using measured data of a plurality of observation points. Additionally, the calculation amount can be reduced because the amount of data that is subject to comparison when superimposing is reduced.

Furthermore, a new representative point and error distribution are obtained and reset in the model updating step through a Kalman filter from a newly inputted measured point coordinate value and the error distribution thereof, and from the representative point and the error distribution thereof that have already been set in the voxel, enabling the obtaining of a shape that is nearer to the true value.

In particular, by repeating the model updating step that uses the Kalman filter, the effect of the Kalman filter produces a highly accurate shape that converges on the true value, even if the data contains error.

Additionally in the fine matching step, a new measured data and error distribution are rotated and translated relative to an environment model for an earlier measuring position, or an environment model for a new measuring position is rotated and translated relative to an environment model for an earlier measuring position, in order to maximize the evaluation value (such as the summation of the degrees of coincidence) regarding the degree of coincidence established through maximum likelihood estimates based on the distance between adjacent error distributions, instead of position matching so as to minimize an evaluation value for the distance between adjacent error distributions, enabling position matching taking into consideration the error in both the environment model and in the measured data.

Other objects and beneficial aspects of the present invention will become clear from the description below, in reference to the attached drawings.

DETAILED DESCRIPTION OF THE PREFERRED EMBODIMENTS

Figure 1:
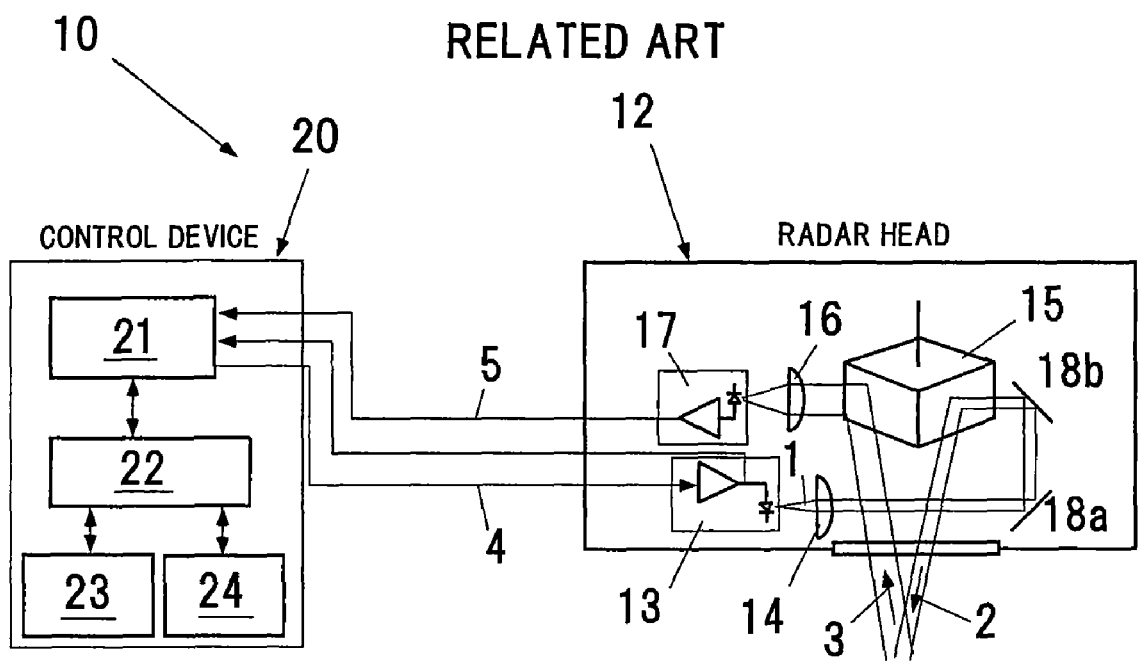
FIG. 1 is a structural drawing of a three-dimensional laser radar disclosed in non-patent document 2.

A preferred embodiment of the present invention will be explained below with reference to the drawings. Note that in each drawing, common portions are assigned same reference numeral, and redundant explanations are omitted.

FIG. 1 is a structural diagram of a three-dimensional laser radar as one example of a range sensor. A three-dimensional laser radar is disclosed in, for example, non-patent document 3.

As is illustrated in the drawing, the three-dimensional laser radar 10 is structured from a radar head 12 and a control device 20. A pulse laser beam 1 generated from a laser diode 13 is shaped into a collimated beam 2 by a projection lens 14, is scanned in two-dimensional directions by mirrors 18a and 18b and polygon mirror 15, which rotates and swings, to illuminate the object to be measured. The pulse laser beam 3 that is reflected from the object to be measured is focused by photo receiver lens 16 via the polygon mirror 15, to be converted into an electrical signal by a photodetector 17.

A time interval counter 21 of a control device 20 measures the time interval of a start pulse 4, which is synchronized with the pulse emission timing of the laser diode 13, and a stop pulse 5, which is outputted from the photodetector 17. A signal processing board 22 outputs time interval t, and the rotation angle θ and the swing angle φ of the polygon mirror as the polar coordinate data (r, θ, φ), at the timing at which the reflected beam is detected.

r is the range (distance) with the measuring position (the installed position of the radar head) being treated as the origin, calculated by the formula r=c×t/2. Here, c is the speed of light.

The determination processing unit 23 converts the polar coordinate data from the signal processing board into three-dimensional spatial data (x, y, z), with the installed position of the radar head being the origin, and performs a detection process. Note that in this figure, 24 is a drive unit.

The scope of measurement of the three-dimensional laser radar 10, described above, is, for example, a horizontal field angle of 60°, a vertical field angle of 30°, and a maximum measurement range of 50 m. Additionally, the position detecting accuracy is, for example, about 20 cm.

Additionally, when the measured data is displayed as a range image having range values in the depth direction for each of the picture elements, if the number of measurement points in one frame is 166 points in the lateral direction and 50 points in the scan direction, then in one frame 166×50=8300 points are displayed. In this case, the frame rate is, for example, about two frames per second.

The measured points on the three-dimensional shape that is measured by the three-dimensional laser radar 10 form a set of points that are mutually dispersed by Δθ×r in the lateral direction, and by Δφ×r in the vertical direction. For example, in the case of Δθ=60/166×π/180=6.3×10⁻³ rad, Δφ=30/50×π/180=10.5×10⁻³ rad, and r=50 m, the interval between measured points will be approximately 315 mm in the horizontal direction and approximately 525 mm in the vertical direction even for the measured points that are most proximal.

In the present invention, a three-dimensional laser radar 10, as described above, for example, is used as the range sensor. However, the range sensor is not limited thereto, but rather may use a range sensor that utilizes parallax, or another known range sensor.

Figure 2A:
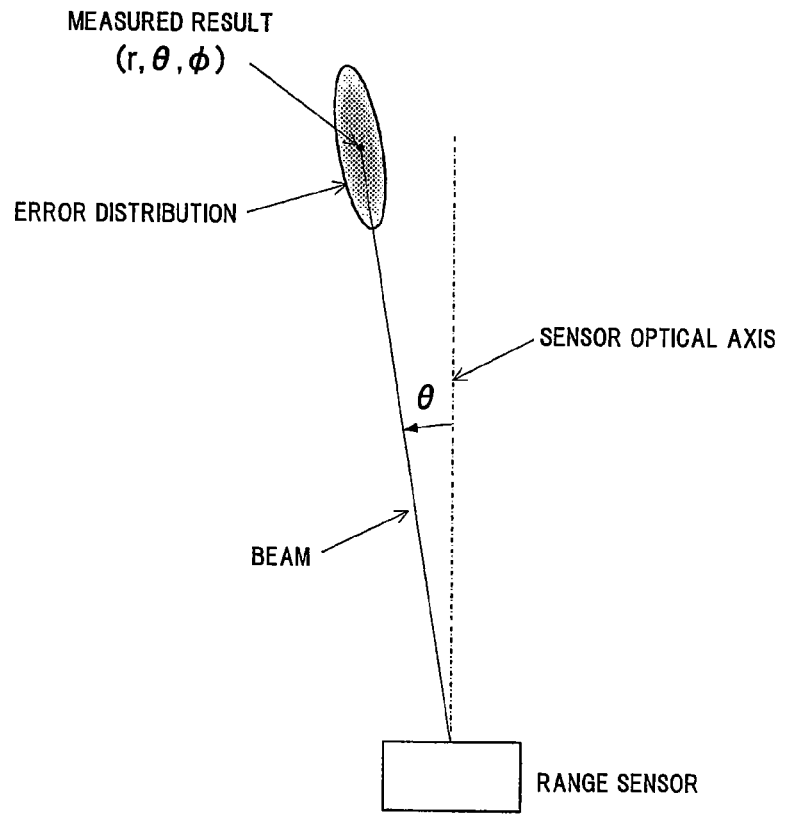
FIG. 2A is a diagram illustrating the relationship between error and polar coordinate data measured using a range sensor.
Figure 2B:
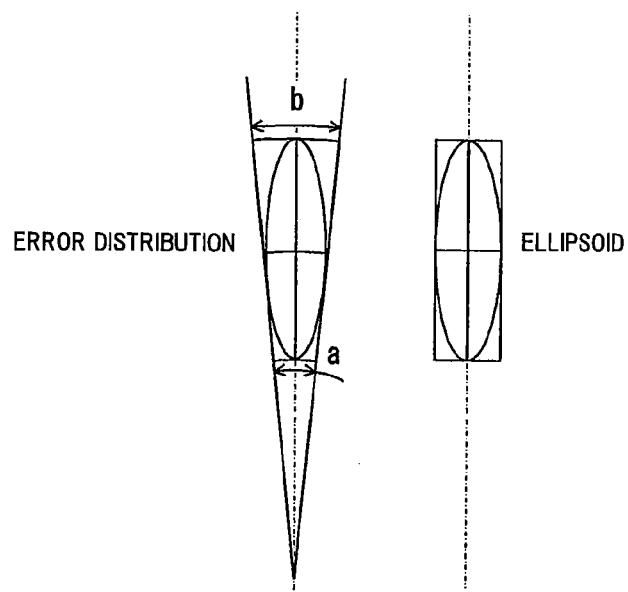
FIG. 2B illustrates a case of approximating the error distribution as an ellipsoid contained in a rectangular solid.

FIG. 2A and FIG. 2B are diagrams illustrating the relationship between error and the polar coordinate data measured using a range sensor.

As is shown in FIG. 2A, the polar coordinate values (r, θ, φ), with an arbitrary measuring position being the origin, are measured as the measurement results. Normally there is an error distribution, such as shown in the figure, in the measurement results from the range sensor.

When this error distribution is the existence probability P $(r_s, \theta_s, \phi_s)$, at the $r_s, \theta_s, \phi_s$ of the error distribution, then the error distribution will have normal distributions in axial r direction, θ direction and φ directions of the measurements, and can be represented as, for example, Formula (1). Here the r, θ, and φ are measured values by the sensor, $\sigma_r$, $\sigma_\theta$ and $\sigma_\phi$ are standard deviations, where A is a normalization constant.

As is shown in FIG. 2B, the error distribution is normally contained within an apex-cut cone that is long in the r direction (left-hand figure), and the difference between a and b in the distant location is small. Consequently, the error distribution can be approximated, on the safe side, as an ellipsoid contained in a rectangular solid.

(Equation 2)

$$P(r_s, \theta_s, \phi_s) = \frac{1}{A}\exp\left(-\frac{(r_s - r)^2}{2\sigma_r^2}\right)\exp\left(-\frac{(\theta_s - \theta)^2}{2\sigma_\theta^2}\right)\exp\left(-\frac{(\phi_s - \phi)^2}{2\sigma_\phi^2}\right) \quad (1)$$

Figure 3:
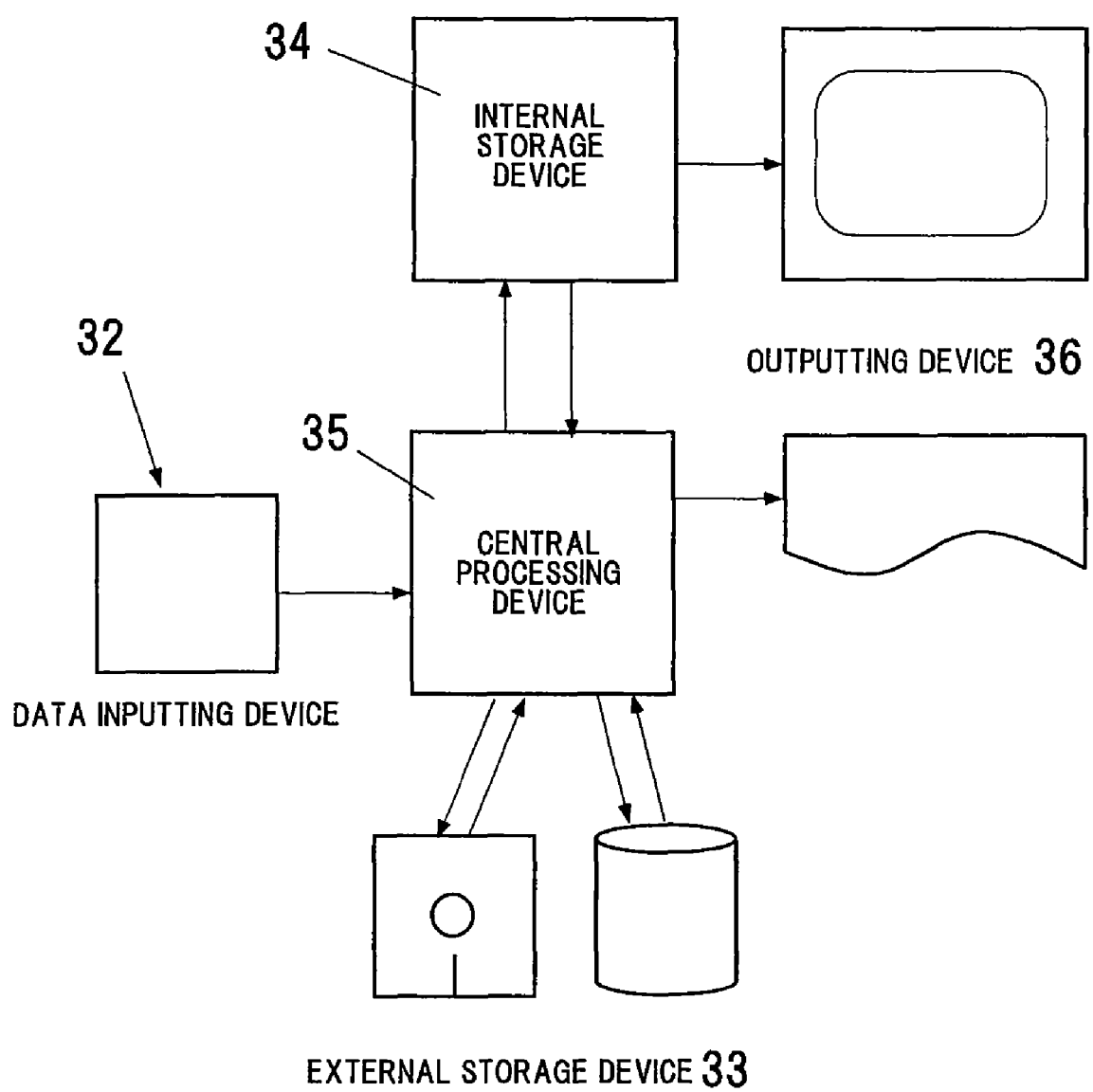
FIG. 3 is a device structural diagram for embodying a method as set forth in the present invention.

FIG. 3 is a device structural diagram for embodying a method as set forth in the present invention. As is shown in this figure, the device is provided with a data inputting device 32, an external storage device 33, an internal storage device 34, a central processing device 35, and an outputting device 36.

The data inputting device 32 has the range sensor described above, and inputs, into the storage devices, the coordinate values on the three-dimensional shape. Additionally, the position/posture, and movement range of the range sensor may be inputted through the use of, for example, a goniometer and an odometer. Note that the data inputting device 32 may also have a normal inputting means, such as a keyboard.

The external storage device 33 is, for example, a hard disk, a Floppy® disk, magnetic tape, a compact disc, or the like. If the size of the environment model becomes large and the coordinate values on the three-dimensional shape, the voxel positions, and the representative points and error distributions thereof cannot be held entirely in the internal storage device 34, as described below, then the external storage device 33 stores a portion or the entirety of the inputted three-dimensional shape coordinate values, voxel positions, and representative points and the error distributions thereof for a partial or entire environment model, and stores a program for executing the method of the present invention.

The internal storage device 34 is, for example, a RAM, a ROM, or the like, and stores a portion or the entirety of the inputted three-dimensional shape coordinate values, voxel positions, and representative points and the error distributions thereof for a partial or entire environment model.

The central processing device (CPU) 35 functions as a model structuring device, a matching device, a position matching device for rough and fine matching, a model updating device, and a data transferring device, and processes centrally calculations, input-output, and the like, and executes programs together with the internal storage device 34. The model structuring device is a device for performing the model structuring step, as described below; the matching device is a device for performing the matching step; the position matching device is a device for performing the rough matching step and the fine matching step, described below; the model updating device is a device for performing the model updating step, described below; and the data transferring device is a device for outputting data to an outputting device 36.

The outputting device 36 is, for example, a display device, a printer, an external storage device, or the like, and is able to output at least the program executing results and the data that is stored in the internal storage device 34 and external storage device 33. The interface with the external storage device is a LAN, a USB, and IEEE 1394, or the like, and outputs, in response to a request, the results of the entirety of the environment model or a portion of the environment model, the results of applying the representative points, error distributions, voxel positions, and the like, within the applicable voxels, corresponding to the inputted coordinate values on the three-dimensional shape, and the like.

The device of the present invention, described above, may be a combination of the range sensor, described above, with a normal PC (computer), or may be an integrated device. Moreover, the device may be incorporated into a device that can move independently.

Figure 4:
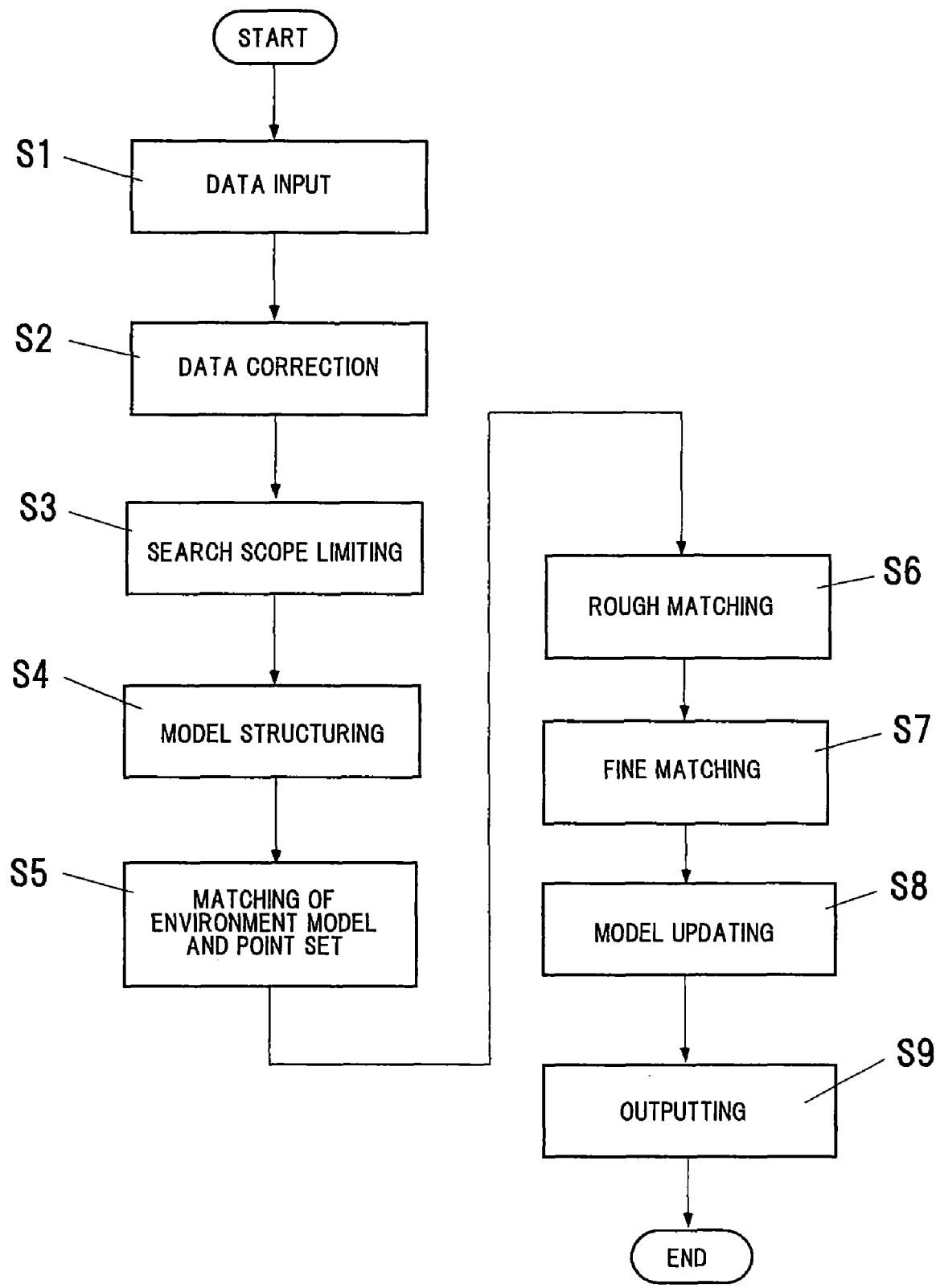
FIG. 4 is a flow chart illustrating a method as set forth in the present invention.

FIG. 4 is a flow chart illustrating a method as set forth in the present invention.

The method of the present invention is a three-dimensional shape data position matching method for reproducing a three-dimensional shape from coordinate values of measured points on a three-dimensional shape, and has a data inputting step S1, a data correcting step S2, a search scope limiting step S3, a model structuring step S4, a matching step S5, a rough matching step S6, a fine matching step S7, a model updating step S8, and an outputting step S9.

Note that of this series of processes, S1, S2, S3, and S5 through S9 are executed each time measured data is obtained, and S4 is executed only when measured data is first obtained.

In the data inputting step S1, the range sensor is used to input coordinate values on the three-dimensional shape into the storage device of a computer. Additionally, the position/posture, and movement range of the range sensor may be inputted through the use of, for example, a goniometer and an odometer.

Furthermore, in this data inputting step S1, a three-dimensional laser radar 10 may be used to sequentially obtain, as range data having arbitrary measuring position as the origin, coordinate values on the three-dimensional shape while moving the origin.

When a three-dimensional laser radar 10 is used as the range sensor, the coordinate values on the three-dimensional shape are range data having arbitrary measuring position as the origin, and are expressed as polar coordinate values $(r, \theta, \phi)$. Moreover, the error distributions of each of the coordinate values are either found through calculating from the polar coordinate values $(r, \theta, \phi)$, or inputted in advance through separate inputting means (for example, a keyboard).

In the data correcting step S2, a range data correcting process is performed to improve the accuracy of the range data. Additionally, the polar coordinate data and the odometer data may be converted into three-dimensional spatial data $(x, y, z)$ having an arbitrary fixed position as the origin.

In the correction process for the range data, acnodes are deleted, statistical processing is performed, and the like. An acnode is a point that exists in isolation from the surrounding points, and because the measured data comprises a plurality of proximal points, acnodes can be assumed to be measurement errors and eliminated. The statistical processes take into account the error distribution included in the statistical data, to correct the ranges by performing statistical processing (such as averaging, or the like) on multiple repeated measurements.

Furthermore, when the target three-dimensional shape can be approximated using a linear approximation or a planar approximation, such approximation may be performed.

The search scope of the range sensor is limited by the search scope limiting step S3.

Multiple solutions (points being measured) may be obtained when a matching process is performed for the measured data for the environment model without limiting the search scope. Given this, (1) the current sensor position is estimated based on the change from a past sensor position to perform searching in the vicinity of the sensor position estimating result; (2) the sensor position is estimated using an odometer to limit the search scope; (3) the search results is narrowed using a reflective strength value and the distance value of the distance data, and the like.

Figure 5:
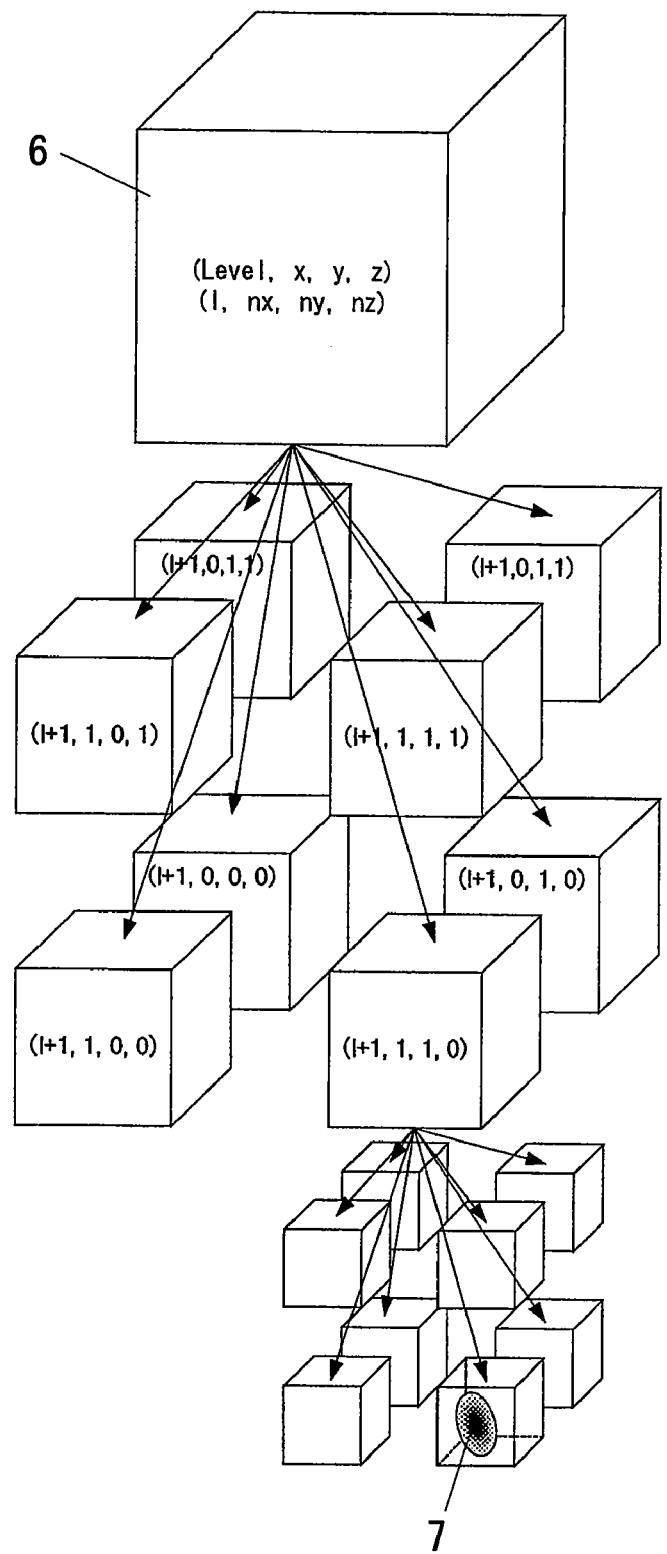
FIG. 5 is a schematic diagram of a model structuring step.

FIG. 5 is a schematic diagram of the model structuring step when oct tree is used in voxel partitioning.

In the model structuring step S4, as is shown in this figure, an environment model is structured wherein a spatial region, in which a three-dimensional shape exists, is partitioned into a plurality of voxels 6 formed from rectangular solids, of which the boundary surfaces are mutually perpendicular, and the positions of the individual voxels are stored.

The shape of the voxel 6 may be a cube wherein the length of each of the sides is identical, or may be a rectangular solid wherein the lengths of the sides are different.

Furthermore, the lengths of each of the edges of the voxel 6 may be set to a magnitude corresponding to the minimum required resolution of the largest voxel 6. In the below, the largest voxel 6 is termed the "level 1 voxel."

In addition, when a plurality of measured points exist within a single voxel, that single voxel is partitioned hierarchically into a plurality of voxels, for example using oct tree partitioning when an oct tree is selected, so that there will be only a single measured point within a single voxel. In the below, a spatial region on which oct tree partitioning of the maximum voxel 6 has been performed once is termed a "level 2 voxel," and a spatial region on which oct tree partitioning has been performed k times is termed a "level k+1 voxel."

Figure 6:
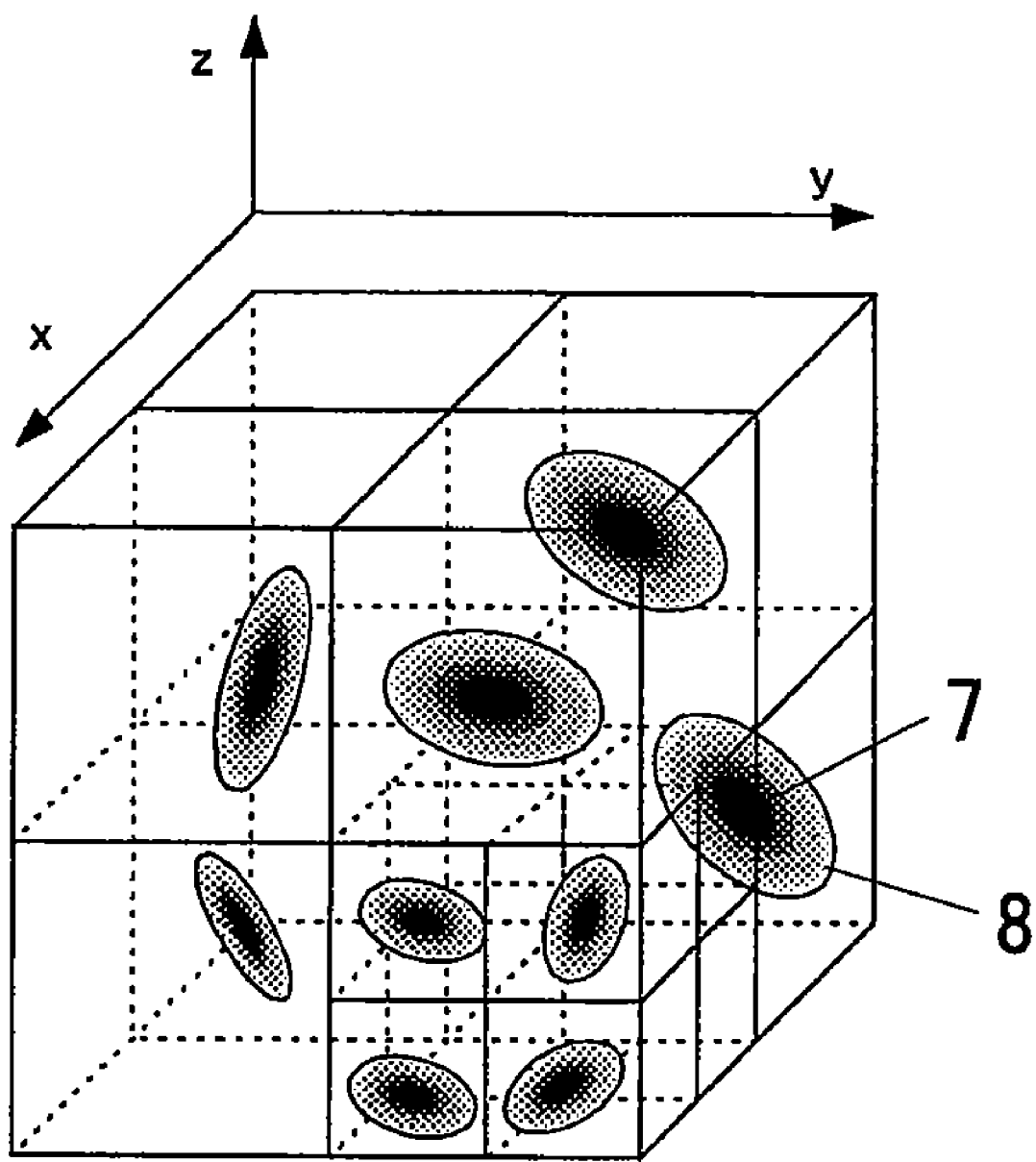
FIG. 6 is a schematic diagram of the environment model constructed.

FIG. 6 is a schematic diagram of the environment model constructed.

In the matching step S5, as is shown in the figure, a representative point 7, and the error distribution 8 thereof, are set into the voxel 6 corresponding to a coordinate value on a three-dimensional shape, and are stored. The final voxel can have only a single representative point for a measured value. Each voxel has a representative point for a measured value, and an error distribution thereof, to represent the shape of the object. Additionally, the voxel may also have a probability value indicating the probability of the existence of the object.

In the matching step S5, the absolute position of the representative point is given by Equation Formula (2) of Equation 3. Here (x, y, z) are the relative coordinates of the voxel of the representative point; Sx, Sy, and Sz are the sizes of the sides of the voxel at level 1; $n_x(k)$, $n_y(k)$, and $n_z(k)$ are the voxel addresses at level k; and L is the level on which the representative point to be calculated exists.

(Equation 3)

$$(x, y, z) + \sum_{k=1}^{L} \left( \frac{S_x}{2^{k-1}} n_x(k), \frac{S_y}{2^{k-1}} n_y(k), \frac{S_z}{2^{k-1}} n_z(k) \right) \quad (2)$$

Figure 7A:
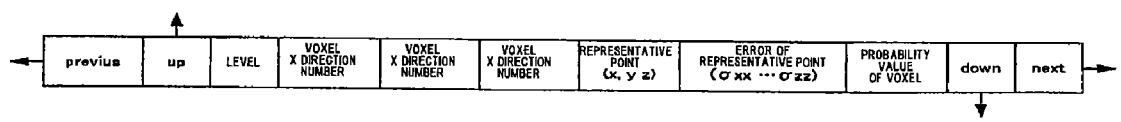
FIG. 7A is a diagram illustrating the data structure of voxel data in the present invention, illustrating a memory layout example for individual voxel data.
Figure 7B:
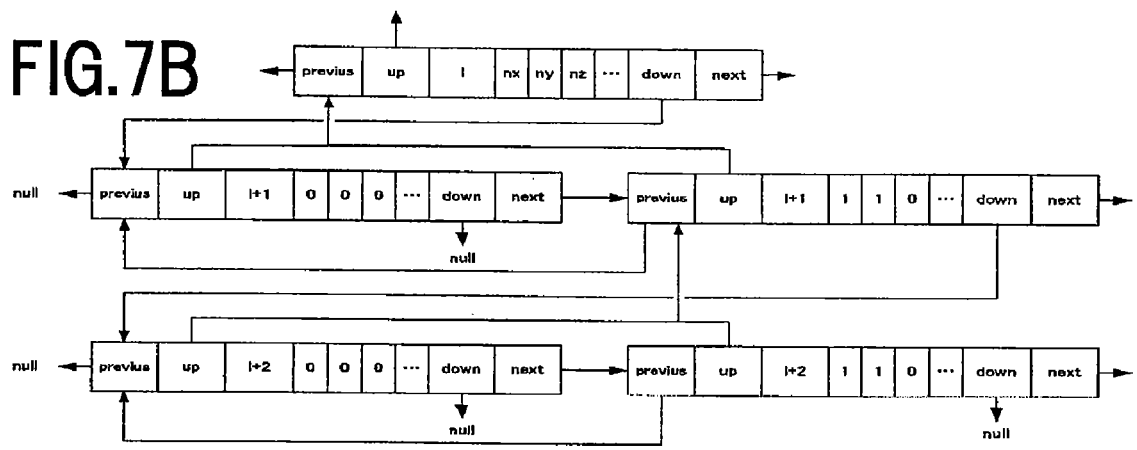
FIG. 7B is a diagram illustrating the data structure of voxel data in the present invention, illustrating an example wherein a level 2 (1, 1, 0) voxel has a representative point.

FIG. 7A and FIG. 7B are figures illustrating data structures for voxel data in the present invention.

In this figure, FIG. 7A is an example of memory layout for individual voxel data. In this figure, the arrow marks indicate links to data and values contain pointers to data.

FIG. 7B illustrates an example of a case wherein a level 2 (1, 1, 0) voxel has a representative point. Note that in this figure, null indicates an empty set.

An environment model, having the data structure described above, has the following characteristics:

(1) Content: A space is partitioned by small rectangular solids, so that each voxel has a representative point and an error distribution for a measurement point.

(2) Accuracy: The representative values correspond to the measurement points for each voxel.

(3) Existence: It is possible to express whether or not an object exists.

(4) Data size: Memory is required proportional to the number of voxels, but the size is constant.

(5) Conversion from a point set: Suitable, with little calculation amount.

(6) Access speed: Access to elements is fast because of the simple structure.

Furthermore, given these characteristics, the environment model described above fulfills all of the following effects A through C:

Effect A: Enables expression taking error into account.

Effect B: The required memory size and calculation amount is less than a specific amount.

Effect C: Expresses not only that an object exists, but that an object does not exist.

In FIG. 4, the rough matching step S6 and the fine matching step S7 are performed after the matching step S5.

Figure 8:
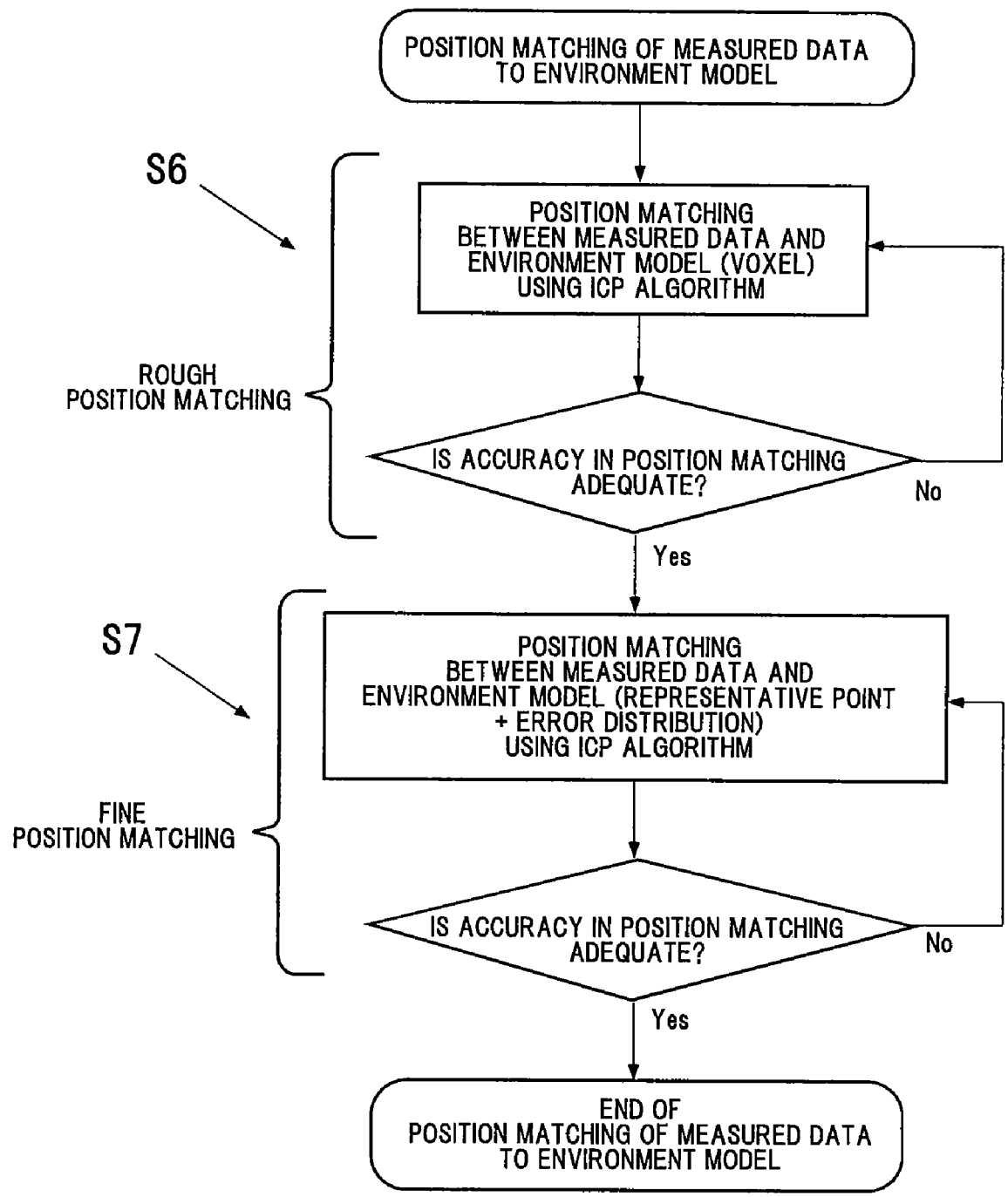
FIG. 8 is a data processing flowchart for the rough matching step S6 and the fine matching step S7.
Figure 9:
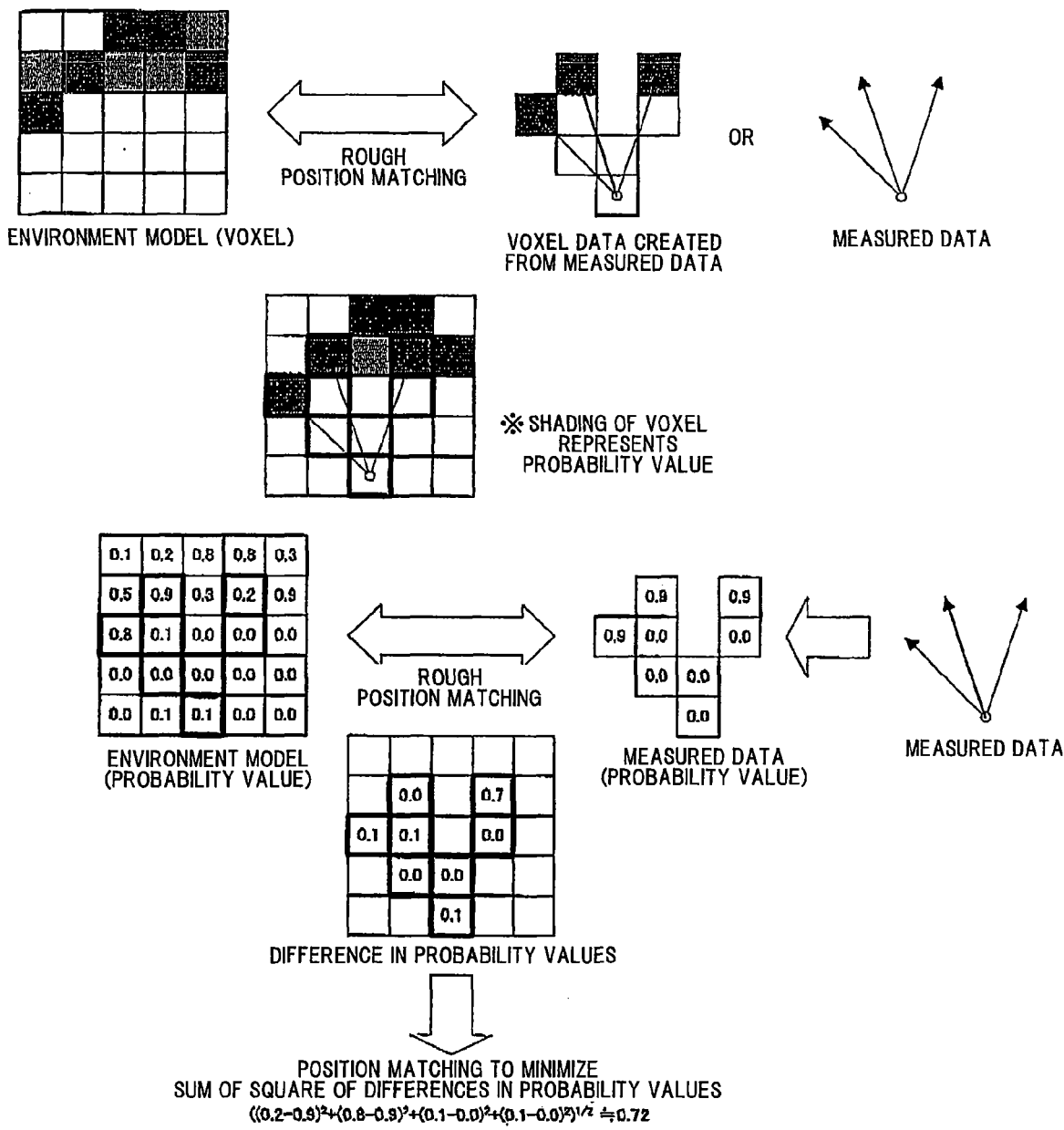
FIG. 9 is a schematic diagram of the rough matching step S6.
Figure 10:
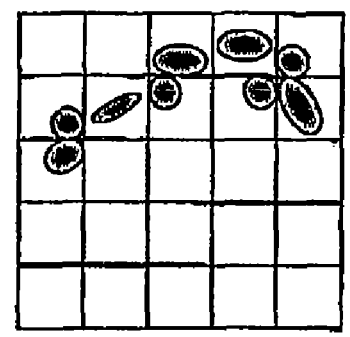
FIG. 10 is a schematic diagram of the fine matching step S7.
Figure 10:
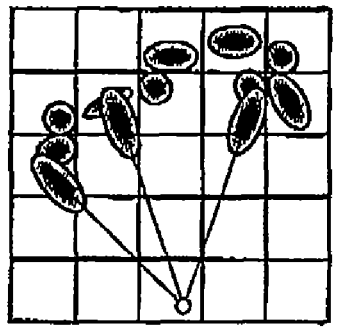
Figure 10:
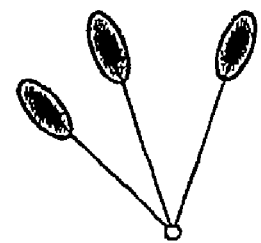

FIG. 8 is a data processing flowchart for the rough matching step S6 and the fine matching step S7; FIG. 9 is a schematic diagram of the rough matching step S6; and FIG. 10 is a schematic diagram of the fine matching step S7.

In FIG. 8, in the rough matching step S6, as is shown in FIG. 9, position matching can be performed by rotating and translating a new measured data and error distribution relative to an environment model for an earlier measuring position to minimize an evaluation value (such as the summation of the distances) regarding the distances from measured data and error distributions to adjacent voxels having representative points, or rotating and translating an environment model for a new measuring position relative to the environment model for the earlier measuring position to minimize an evaluation value (such as the summation of the distances) regarding the distances between voxels having representative points, or, by performing position matching by rotating and translating a new measured data and error distribution relative to an environment model for an earlier measuring position to maximize an evaluation value (such as the summation of the probability values) regarding the probability values of voxels having representative points adjacent to measured data and error distributions, or rotating and translating an environment model for a new measuring position relative to an environment model for an earlier measuring position to minimize an evaluation value (such as the summation of the differences in probability values) regarding the differences in probability values of adjacent voxels.

The position matching in rough matching step S6 is achieved by expressing an environment model and measured data in a voxel space, or, by expressing an environment model on a voxel space and expressing representative points and error distributions as measured data. With the current measured data being measured at a position (x, y, z) and an posture (θ, φ, ψ), the measured data is converted into world coordinates, and the degree of coincidence between the measured data and the environment model is calculated.

The minimal distance method, for example, may be used to calculate the degree of coincidence. The distance between voxels when the minimal distance method is used can be defined by equation Formula (3) of Equation 4, where two voxel spaces are defined as $x^{(1)}$ and $x^{(2)}$, the total number of voxels is defined as I, and the voxel value is defined as $x_i^{(n)}$.

The optimal position and orientation (posture) for the measured data can be calculated by the least-squares method by minimizing ε through varying the position (x, y, z) and orientation (θ, φ, ψ).

Additionally, the degree of coincidence can use an evaluation value (for example, the summation of differences of probability values) relating to the difference of probability values of two adjacent voxels in, for example, the environment model and measured data for two voxels. In this case, the optimal position and orientation (posture) of the measured data is varied in order to minimize the degree of coincidence.

Additionally, when the environment model is in voxel space and the measured data expresses representative values and error distributions, an evaluation value (for example, the summation of the probability values) regarding the probability values of voxels in an environment model wherein the representative values and error distributions of the measured data are adjacent can be used as the degree of coincidence. In this case, the optimal position and orientation of the measured data is varied in order to maximize the degree of coincidence.

(Equation 4)

$$\varepsilon = \|x^{(1)} - x^{(2)}\| \quad (3)$$
$$= \left\{ \sum_i^I (x_i^{(1)} - x_i^{(2)})^2 \right\}^{1/2}$$

In FIG. 8, in the fine matching step S7, as is shown in FIG. 10, position matching is performed so as to minimize an evaluation value (for example, the summation of the distances) relating to the distance between adjacent error distributions by rotating and translating a new measured data and error distribution, or rotating and translating an environment model for a new measuring position, relative to an environment model for a previous measuring position.

In position matching of environment models and measured data in the fine matching step S7, ICP algorithm for position matching between a point set and a point set is used by taking the error distribution into account. In position matching, the position/orientation obtained through rough position matching are used as the initial values.

In calculating the distance between error distributions using the ICP algorithm, the error distributions that intersect each other are considered to be a single measurement point, and the distance values in this case are multiplied by a weight calculated from the degrees of coincidence of the distributions to perform the calculations. In the coincidence of the distribution, a distance scale such as Mahalanobis' generalized distance, for example, may be used.

The distances of the environment models and the measured data in this case, is defined in Formula (4) of Equation 5 where the environment model data is defined as $p_{Mi}$, the error distribution of the environment model data is defined as $\Sigma_{Mi}$, the measured data is defined as $P_{Di}$, the error distribution of the measurement date is defined as $\Sigma_{Di}$, the composite function for the error distribution is defined as w, and the number of environment model data corresponding to the measured data is defined as N. Here T indicates a transposition.

The optimal position and orientation for the measured data can be calculated by the least-squares method by minimizing ε through varying the position (x, y, z) and orientation (θ, φ, ψ) measured for the measured data and moving $P_{Di}$.

(Equation 5)

$$\varepsilon = \sum_{i=1}^{N} (p_{M_i} - p_{D_i})^T w(\Sigma_{M_i}, \Sigma_{D_i})(p_{M_i} - p_{D_i}) \quad (4)$$

Furthermore, in FIG. 4, the model updating step S8 is performed after the fine matching step S7, to update the environment model structured in the model structuring step S4.

Figure 11:
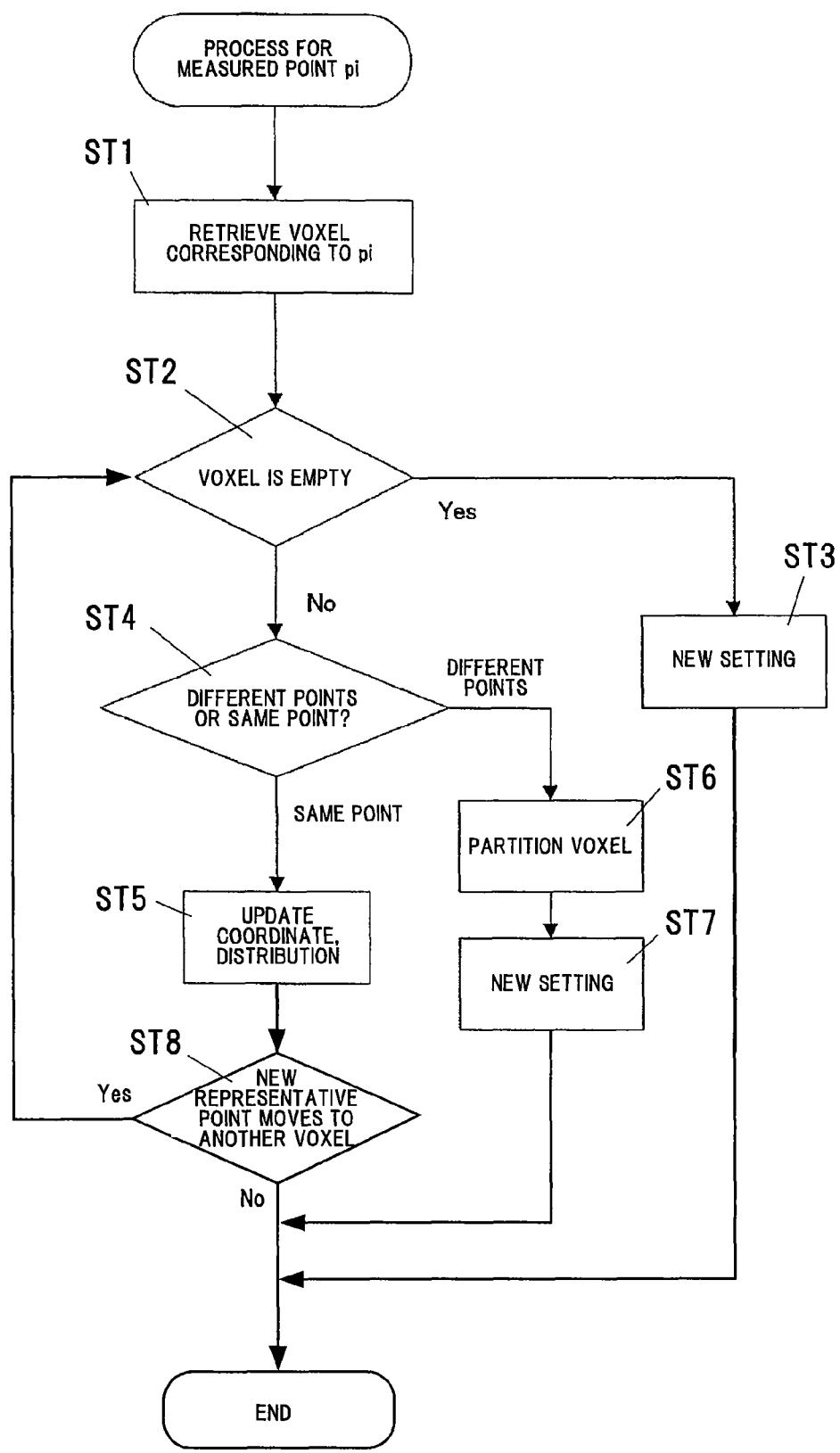
FIG. 11 is a data processing flowchart in the model updating step.

FIG. 11 is a data processing flowchart of the model updating step S8. As is shown in this figure, in step ST1, a voxel corresponding to a coordinate value of a newly inputted measurement point is retrieved, and if, in step ST2, there is no representative point within the applicable voxel (that is, the voxel is empty), then, in step ST3, the coordinate value and the error distribution of the newly inputted measurement point are set as the coordinate value and error distribution of the representative point (new registration).

Additionally, in step ST3, in principle, no object should exist between the new measuring position (the origin) and the measured point (the point to be measured). Consequently, the representative point and error distribution within the voxel that is positioned between the new measuring position (origin) and the measured point is reset or eliminated.

Figure 12:
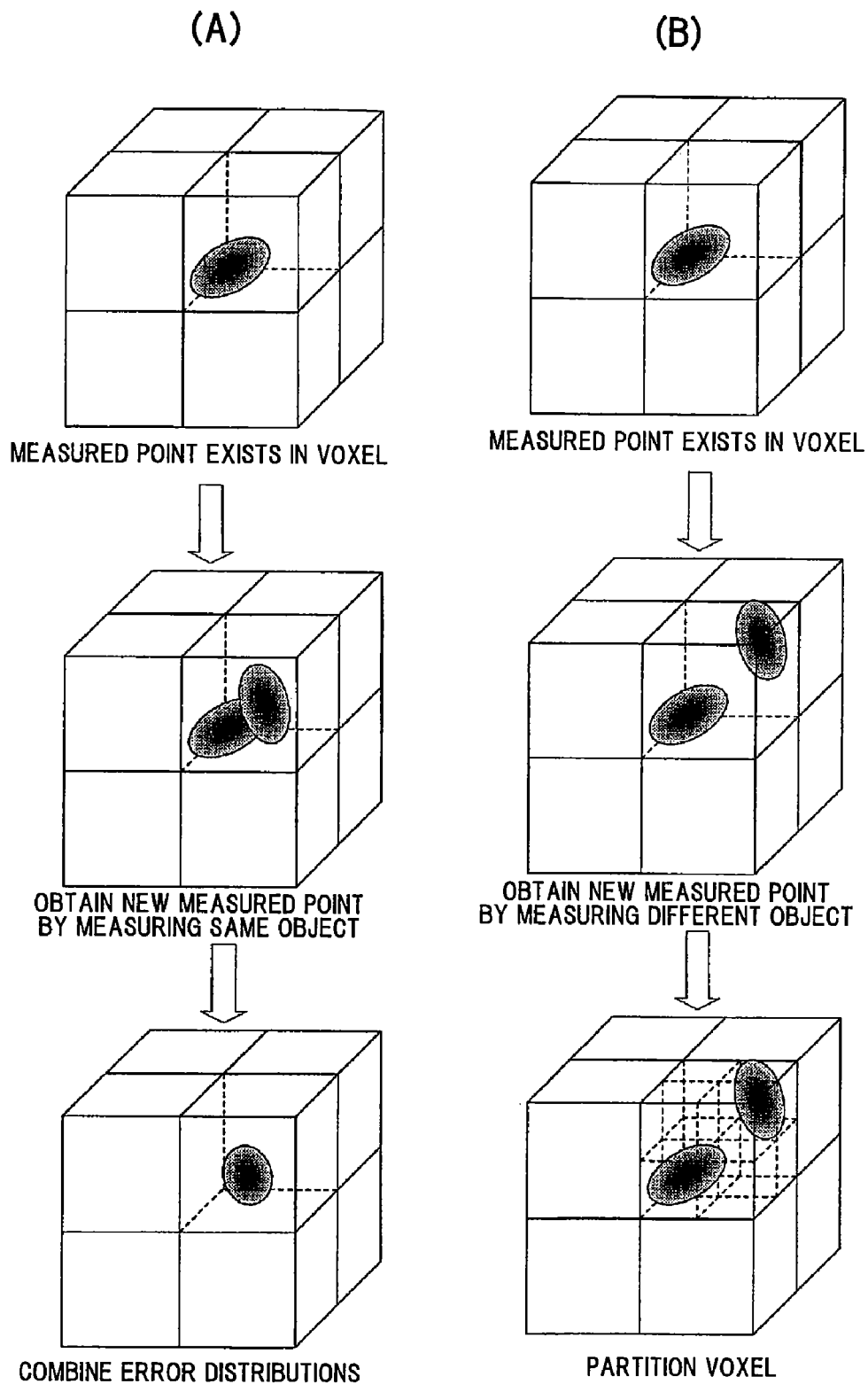
FIG. 12 is a schematic diagram of the case wherein a representative point has already been set in the applicable voxel.

FIG. 12 is a schematic diagram of the case wherein a representative point has already been set in the applicable voxel.

In step ST2 of FIG. 11, if there is a representative point already set within the applicable voxel, then, in step ST4, the newly obtained error distribution and the error distribution already set within the voxel are compared (in other words, a determination is made as to whether they are different points or identical points).

If, in this comparison, the error distributions mutually overlap (FIG. 12A), then, in step ST5, a new error distribution and new representative point are reset from both of the error distributions, or from both error distributions, the representative point that is already set within the voxel, and the coordinate value of the newly inputted measurement point (that is, the error distributions are combined).

Moreover, if, in this comparison, the error distributions do not mutually overlap (FIG. 12B), then, in Steps ST6 and ST7, the applicable voxel is further oct tree partitioned hierarchically into a plurality of voxels, which are then newly registered, so that there will be only a single representative point in a single voxel.

The reference for partitioning and combining is determined based on, for example, the degree of coincidence of the error distributions. In the degree of coincidence of the error distribution, a distance scale such as Mahalanobis' generalized distance, for example, may be used. In addition, it may be determined through statistical testing, based on the two error distributions, whether or not the two express the identical point.

In step ST5, if the result of setting a new error distribution and a new error distribution center from both error distributions is that the new representative point has moved into a new voxel (that is, YES in step ST8) processing returns to step ST2, and the process above is repeated.

Figure 13:
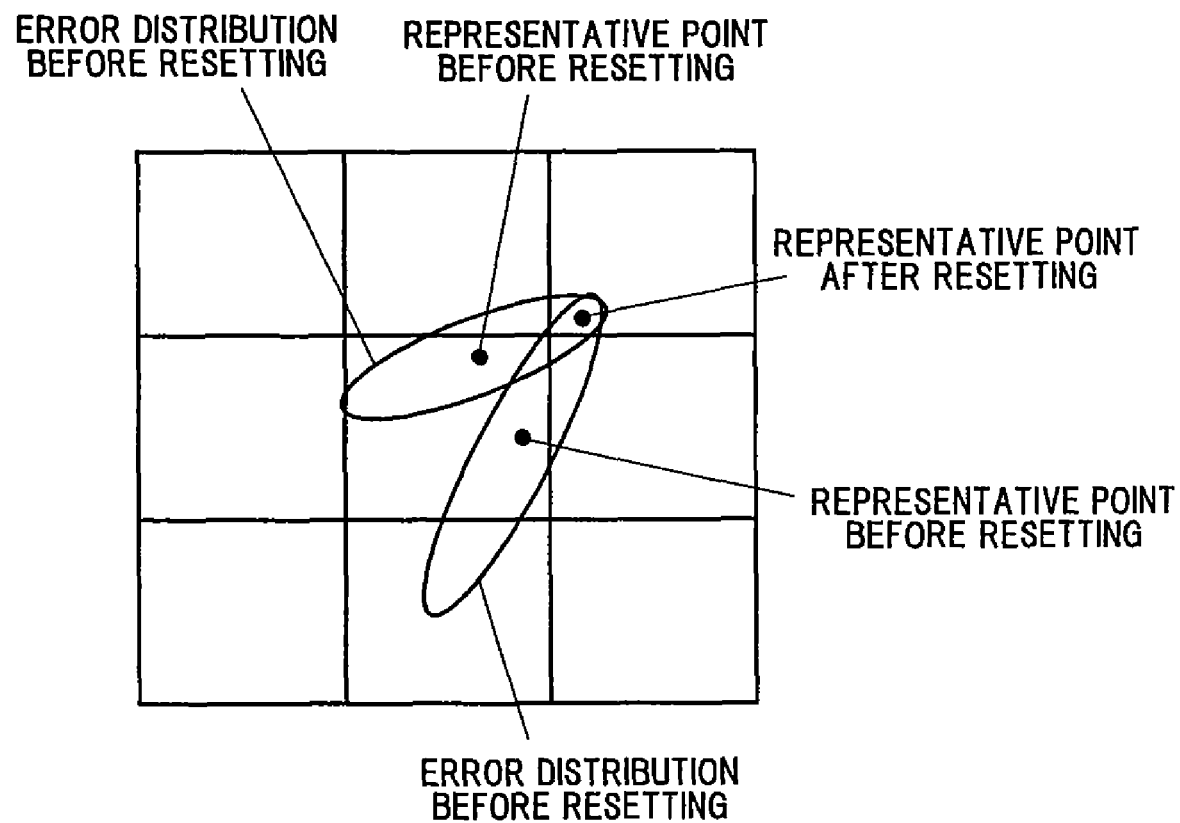
FIG. 13 illustrates the case wherein the new representative point has moved to within a different voxel as the result of resetting a new error distribution and the center of the new error distribution from both error distributions, when the error distributions are mutually overlapping.

Note that FIG. 13 illustrates the case wherein the new representative point has moved to within another voxel, as the result of resetting a new error distribution and a new error distribution center point from both of the error distributions in step ST5, or from both of the error distributions and the representative point already set within the voxel and the coordinate values of the newly inputted measurement point.

When a probability value that represents the probability of existence of an object is set in a voxel, then, in the model updating step S8, a representative point and error distribution are newly registered or reset or deleted within the voxel, or depending on the process for new registration after partitioning, the probability value within the voxel is newly registered or reset or deleted through a statistical process, or newly registered after partitioning.

Figure 14:
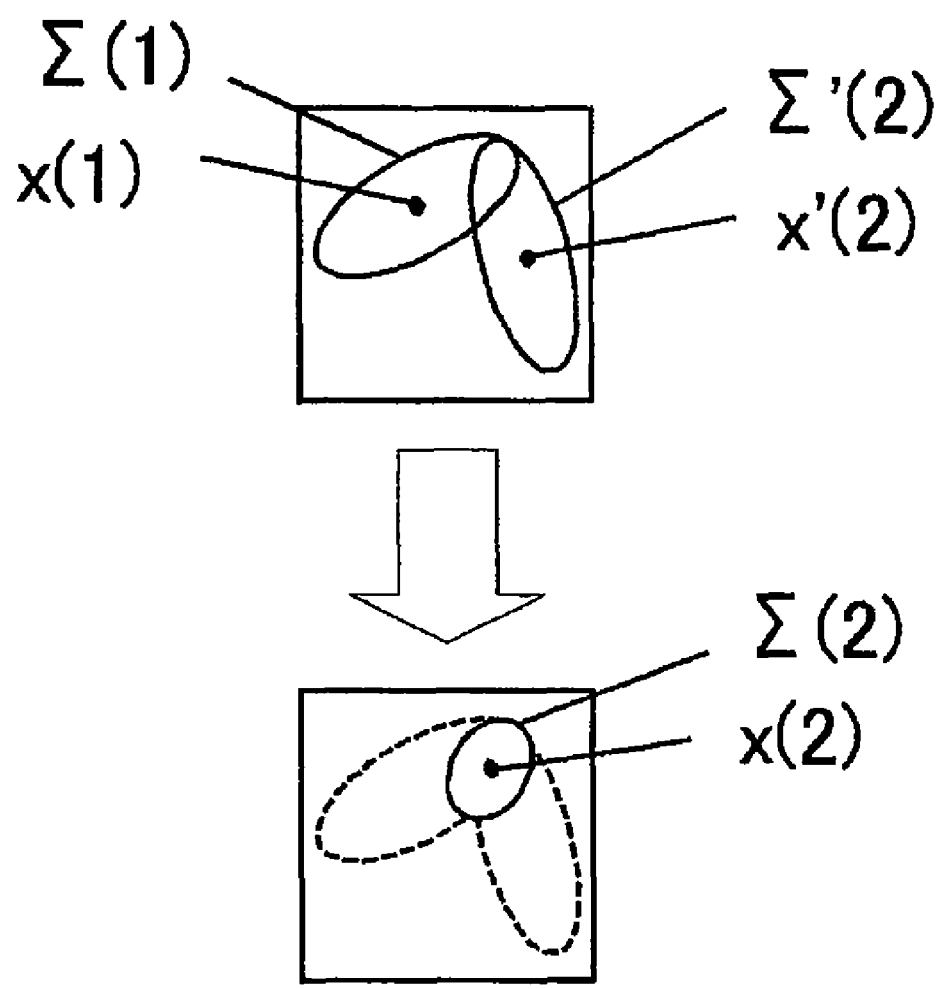
FIG. 14 is a schematic diagram of the case wherein error distributions are mutually overlapping.

FIG. 14 is another schematic diagram of the case (FIG. 12A) wherein error distributions are mutually overlapping. In step ST5, a Kalman filter can be used as means for setting the new representative point and error distribution by combining two representative points and error distributions. For example, in the two-dimensional case, as shown in this figure, if the two representative points are, respectively, x (1) and x' (2), and the two error distributions are Σ(1) and Σ'(2), and the combined representative point is x (2) and error distribution is Σ(2), a schematic diagram of a calculation of the representative point x (2) and of the error distribution Σ(2) is as in FIG. 14.

In FIG. 4, in the outputting step S9, the voxel position, the representative point, and the error distribution are outputted to the outputting device 36. For the case wherein the outputting device 36 is a display device (for example, a CRT), preferably there is a three-dimensional display on a three-dimensional image. Moreover, these data may be transferred to another device (for example, a control device/computer) or may be outputted to a printer.

In the outputting step S9, along with the self-position, the voxel position, the representative point, and the error distribution are output to the outputting device based on the self-position. Additionally, in the outputting step S9, not only the position of the representative point of the voxel is outputted to the outputting device 36 as the three-dimensional shape measurement value, but also an index (such as a numeric value) indicating the reliability or accuracy of the measurement value is outputted to the outputting device 36 based on the magnitude or size of the error distribution within the voxel. Moreover, in this outputting step S9, when the position of the representative point of the voxel is outputted to the outputting device 36 as the three-dimensional shape measurement value, if the magnitude (width) of the error distribution within the voxel is larger than a specific reference value, then the reliability or accuracy of the measurement value is less than a specific reference, and the measurement value for the voxel (that is, the position of the representative point for the voxel) is not outputted to the outputting device 36.

The sequence of processes illustrated in FIG. 4 is repeated each time new measured data can be obtained at a new measuring position, and the results are stored in the internal storage device 34 and/or external storage device 33. In order to increase the speed of processing, the results should be stored in the internal storage device insofar as capacity allows.

The method and device as set forth in the present invention, as described above, partition a spatial region in which a three-dimensional shape exists into a plurality of voxels 6 and record, in an external storage device 33, the position of each voxel, so that when the object to be measured is large, the data size is kept small in proportion to the number of voxels.

Additionally, a representative point 7 and an error distribution 8 thereof are set and recorded within a voxel 6 corresponding to a coordinate value, enabling the display of data at greater than the voxel resolution.

Additionally, setting and storing a probability value that indicates the probability of the existence of an object within the voxel enables an easy determination as to the probability value for the voxel without having to find a voxel having a representative point that represents whether or not an object exists in the voxel, and without having to recalculate from the error distribution, even when the error distribution is wider than the voxel having the representative point, thus making it possible to suppress the search time.

In addition, obtaining the current measuring position by estimating from a change in the measuring position of the past, or from a sensor that is capable of obtaining the current measuring position, or by using a reflective strength value instead of using just the distance value of the measured data limits the scope of checking, thereby enabling the search time to be suppressed.

Additionally, in a rough matching step S6, position matching can be performed by rotating and translating a new measured data and error distribution relative to an environment model for an earlier measuring position to minimize an evaluation value (such as the summation of the distances) regarding the distances from measured data and error distributions to adjacent voxels having representative points, or rotating and translating an environment model for a new measuring position relative to an environment model for an earlier measuring position to minimize an evaluation value (such as the summation of the distances) regarding the distances between voxels having representative points, or, by performing position matching by rotating and translating a new measured data and error distribution relative to an environment model for an earlier measuring position to maximize an evaluation value (such as the summation of the probability values) regarding the probability values of voxels having representative points adjacent to measured data and error distributions, or rotating and translating an environment model for a new measuring position relative to an environment model for an earlier measuring position to minimize an evaluation value (such as the summation of the differences in probability values) regarding the differences in probability values of adjacent voxels, making it possible to perform position matching, to each other, of voxels having representative points, doing so in a short period of time, while preventing cumulative error.

Following this, in a fine matching step S7, position matching is performed so as to minimize an evaluation value (such as the summation of the distances) for the distances between adjacent error distributions by rotating and translating a new measured data and error distribution, or rotating and translating an environment model for a new measuring position, relative to an environment model for an earlier measuring position, so fine position matching of error distributions to each other can be performed in a short period of time.

Consequently, by using the model data that is obtained by integrating, into the environment model of the present invention, measured data that is obtained sequentially, the position orientation that matches best the measured data can be calculated, and the cumulative error can be prevented.

Additionally, when the environment model of the present invention is used, the number of points is reduced because there is a single representative point within a voxel, to reduce the calculation amount. Additionally, notwithstanding the reduction in the number of points, the environment model of the present invention maintains accuracy by creating a hierarchy of voxels and error distributions of representative points.

Additionally, while the conventional ICP algorithm outputs erroneous results for sparse data, the environment model of the present invention has representative points and error distributions within voxels, and thus position matching is possible for sparse data.

Consequently, the method and device as set forth in the present invention enables shapes to be restored in high-resolution while preventing cumulative error, even with sparse data, in restoring three-dimensional shape information using measured data of a plurality of observation points. Additionally, the calculation amount can be reduced because the amount of data that is subject to comparison when superimposing is reduced.

Additionally, in the model structuring step S4, the largest voxel 9 is set to a size corresponding to the minimum required resolution, and when a plurality of measuring points exists within a single voxel, the voxel is further oct tree partitioned hierarchically into a plurality of voxels so that only a single measuring point exists within a single voxel, making it possible to simultaneously suppress the data size and further increase the resolution through the use of the voxels and representative points after partitioning.

In particular, by obtaining a plurality of coordinate values on a three-dimensional shape as range data with a plurality of measuring positions being the origin and using the coordinate values of the range data as the coordinate values of the representative points and using the measurement error of the coordinate values of the range data as the error distribution of the representative points, precise coordinate values and error distributions can be used to combine a plurality of measurements statistically, enabling further increased accuracy.

Furthermore, assuming no object exits between the origin and the measuring point, resetting or eliminating representative points and error distributions within the voxels positioned therebetween enables the elimination of erroneous measured data.

Additionally, retrieving the voxel that corresponds to the coordinate value of a newly inputted measured point, and setting the coordinate value and the error distribution as the coordinate value and error distribution of the representative point when there is no representative point in the voxel, enables the coordinate value and error distribution of the representative point to be set easily.

Furthermore, when there is a representative point that has already been set within the voxel, a newly obtained error distribution and the error distribution already set within the voxel are compared;

and if the error distributions are mutually overlapping, a new error distribution and a new representative point are set from both of the error distributions or from both of the error distributions and the representative point already set within the voxel and the coordinate values of the measured point newly inputted; and if the error distributions are not mutually overlapping, then the voxel is further oct tree partitioned hierarchically into a plurality of voxels so that only a single representative point exists within a single voxel, thereby making it possible to cause convergence to a high accuracy shape while avoiding the accumulation of error.

Consequently, given the method and device as set forth in the present invention, not only a function for correcting, into correct data, range data that includes error is obtained, but also this function is repeated, causing convergence to a highly accurate shape in measurements over extended periods of time. Furthermore, the method as set forth in the present invention has low calculation amount because it is a process that updates representative points 7, which correspond to the individual voxels 6, and updates the error distributions 8 thereof, by new measured points. Furthermore, the calculation is closed within a voxel, having no influence on the surrounding voxels, enabling high-speed processing. Additionally, the measured data can be integrated sequentially into voxel structures wherein the largest voxels have resolutions at the minimum requirements, so the memory size does not greatly rise above a fixed size.

The model updating step using the Kalman filter will be described in detail.

In the model updating step using the Kalman filter, a new representative point and error distribution are obtained and reset through a Kalman filter from the newly inputted measured point coordinate value and the error distribution thereof, and the representative point and the error distribution thereof that have already been set in the voxel.

With each position m (i) of model point set being treated as a status quantity, the model can be expressed by the following Equation 6 based on the position of the measuring points of the range sensor. Note that in the present embodiment, m(i) is the representative point in the voxel (also in the description below)

$$L(j) = h_m(R_r, t_r, m(i)) + v_L(j) \quad \text{(Equation 6)}$$
$$= R_s^{-1}(R_r^{-1}(m(i) - t_r) - t_s) + v_L(j)$$
$$(j = 1, \ldots, N)$$

In Equation 6:

L (j) is the measured position by the range sensor. For example, L (j) is L (j)=$(x_L(j), y_L(j), z_L(j))^t$ for measured points j (j=1, ..., N) of a three-dimensional LRF (laser range finder) in the sensor coordinate system of the range sensor. Here t indicates the transposed matrix (also in the description below).

$h_m(R_r, t_r, m(i))$ is the observation system model regarding L (j).

$R_r$ is the rotation matrix $R_r$=($\theta_x$, $\theta_y$, $\theta_z$) that indicates the posture relative to the world coordinate system of the moving unit (for example, a moving robot) on which the range sensor is mounted. Note that $\theta_x$, $\theta_y$, $\theta_z$ indicate the degrees of rotation around the x-axis, y-axis, and the z-axis, respectively (also in the description below).

$t_r$ is the translation vector $t_r$=(x, y, z)) that indicates the position relative to the world coordinate system of the moving unit (for example, a moving robot) on which the range sensor is mounted.

$V_L$ (i) is the observation noise that is added to the measured value L (j) of the range sensor.

$R_s$ is the rotation matrix $R_s$=R ($\theta_x$, $\theta_y$, $\theta_z$) of the sensor coordinate system relative to the moving unit coordinate system.

$t_s$ is the translation vector $t_s$=(x, y, z) that expresses the position of the sensor coordinate system relative to the moving unit coordinate system.

The object being measured is stationary, where the position and posture of the object being measured are stationary relative to the environment model.

The set of measured points by the range sensor are correlated with the points i (that is, the representative points) of the environment model point set. The points i of the model point set for which this correlation is performed are updated by the following equation. Note that only the representative points m (i) of the model point set that is correlated with the measured point set by the range sensor may be updated by the following Equation 7.

$$K_{mk}(i) = \Sigma_{mk,k-1}(i) H_{mk}(j)^t (H_{mk}(j) \Sigma_{mk,k-1}(i) H_{mk}(j)^t + \Sigma_{Lk}(j))^{-1} m'_k(i) = m_{k,k-1}(i) + K_{mk}(i)(L_k(j) - h_{mk}(R_{rk}, t_{rk}, m_{k,k-1}(i))) \Sigma'_{mk}(i) = \Sigma_{mk,k-1}(i) - K_{mk}(i) H_{mk}(j) \Sigma_{mk,k-1}(i) \quad \text{(Equation 7)}$$

In Equation 7:

The suffix k indicates the value at the discrete time k.

In regards to $m_k(i)$, $m'_k(i)$ indicates the updated value (the posteriori inference value) of $m_k(i)$ where $m_{k, k-1}(i)$ indicates the predicted value (the a priori inference value) of $m_k(i)$ based on $m'_{k-1}(i)$. Note that the environment (the object to be measured) is stationary, so $m_{k, k-1}(i) = m'_{k-1}(i)$.

$\Sigma_{mk}(i)$ is the error covariance matrix (that is, the error distribution, described above) of the representative point $m_k(i)$ within a voxel. Additionally, in regards to $\Sigma_{mk}(i)$, $\Sigma'_{mk}(i)$ indicates the updated value (the posteriori inference value) of $\Sigma_{mk}(i)$ where $\Sigma_{mk, k-1}(i)$ indicates the predicted value (the a priori inference value) of $\Sigma_{mk}(i)$ based on $\Sigma'_{mk-1}(i)$. In the sensor coordinate system, the position of the three-dimensional LRF measured point j (j=1, ..., N) is expressed by L (j), where the error covariance matrix is expressed by $\Sigma_L(i)$. Here the N is the total number of measured points obtained by the three-dimensional LRF. For the error model for the three-dimensional LRF, a constant normal distribution that is independent of the measurement distance is assumed. When the laser is emitted in the direction of the x-axis in the sensor coordinate system, the error covariance matrix will be $\Sigma_s$. The posture of the error distribution will vary depending on the direction in which the laser is emitted. $\Sigma_L(j)$ indicates the $\Sigma_L(j) = R_L(j) \Sigma_s R_L'(j)$ using the rotation matrix $R_L(i)$ for the direction in which the laser is emitted relative to the standard direction. The position z (j), and the error covariance matrix $\Sigma_z(j)$ in the world coordinate system of the measured point j can be expressed, respectively, by $$z(j) = R_r(R_s L(j) + t_s) + t_r$$

and $$\Sigma_z(j) = R_r R_s \Sigma_L(j) R_s^t R_r^t.$$

$K_{mk}(i)$ is the Kalman gain for $m_k(i)$.

$h_{mk}(R_{rk}, t_{rk}, m_{k,k-1}(i))$ is the observation system model regarding $L_k(j)$, $i = p_k(j)$. $i = p_k(j)$ is a point on the environment map (or in other words, the environment model) corresponding to the measured point j.

$H_{mk}$ is the Jacobian matrix for the observation system model for $L_k(j)$ and $i=p_k(j)$ and is expressed by the following Equation 8.

$$H_{mk}(j) = \left. \frac{\partial h_{mk}(R_k, t_k, m_k(i))}{\partial m_k(i)} \right|_{m_k(i)=m_{k,k-1}(i)} \quad \text{(Equation 8)}$$

The updating process using the Kalman filter updates the environment model, using the following procedures, at the stage wherein the updated value $m'_k(i)$ of each point (the representative points for the voxels) of the model point set and the updated value $\Sigma'_{mk}(i)$ of error covariance matrix for the environment map are obtained:

(1) These updated values $m'_k(i)$, $\Sigma'_{mk}(i)$ are reset as a new representative point and error distribution.

(2) If the result of (1) is that the position of the representative point has moved into another voxel, and if the voxel to which the representative point has moved does not already have a representative point, then the representative point and error covariance matrix after the move will be held in the destination voxel, and the representative point and so on, will be deleted from the origin voxel. If the voxel that is the move destination already has a representative point, then a determination is made as to whether or not the error distributions of the two representative points overlap each other (the same as the decision in ST 4, above). The process thereafter is the same as the processes in and after ST4, and beyond, in FIG. 11.

(3) When it comes to a point to be measured by the range sensor for which no correlation has been defined with a representative point m(i) of a model point set, if the voxel including this measured point does not have the representative value, that representative point and error distribution are added and maintained as the representative point and error distribution for that voxel. If a representative point already exists within the voxel, the voxel is partitioned such that the existing representative points and each of the measured points, including another plurality of points for which no correlation (or correspondence) has been made, will all be included in different voxels, so that the voxels inherit the representative points and the like.

Repeating the model updating step using the Kalman filter, as described above, not only gradually reduces the scope of the error covariance matrix (that is, the error distribution), but also makes voxels easier to partition. Partitioning the voxels enables expression of changes that are smaller in size than the initial voxels.

Figure 15:
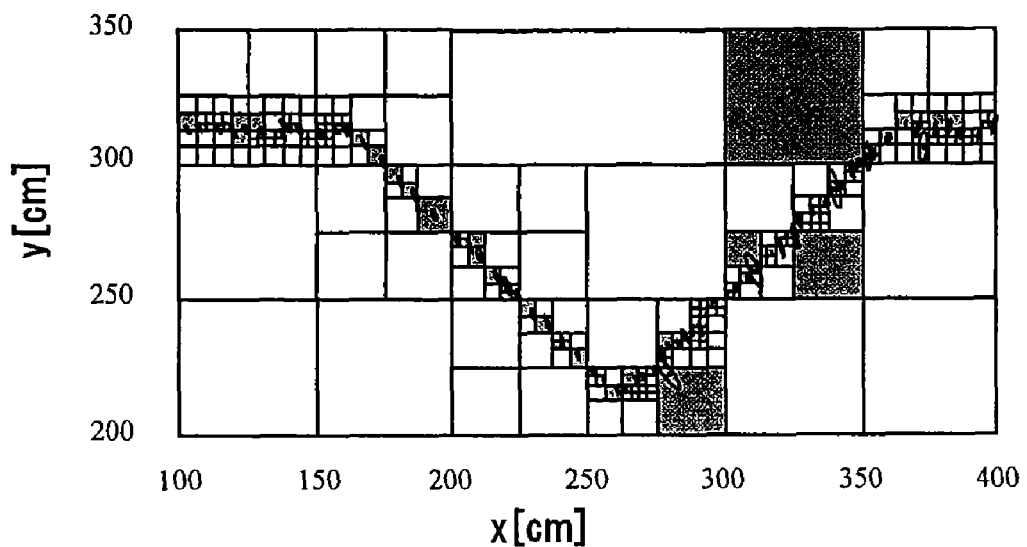
FIG. 15 illustrates the result obtained through the model updating step using the Kalman filter.
Figure 16:
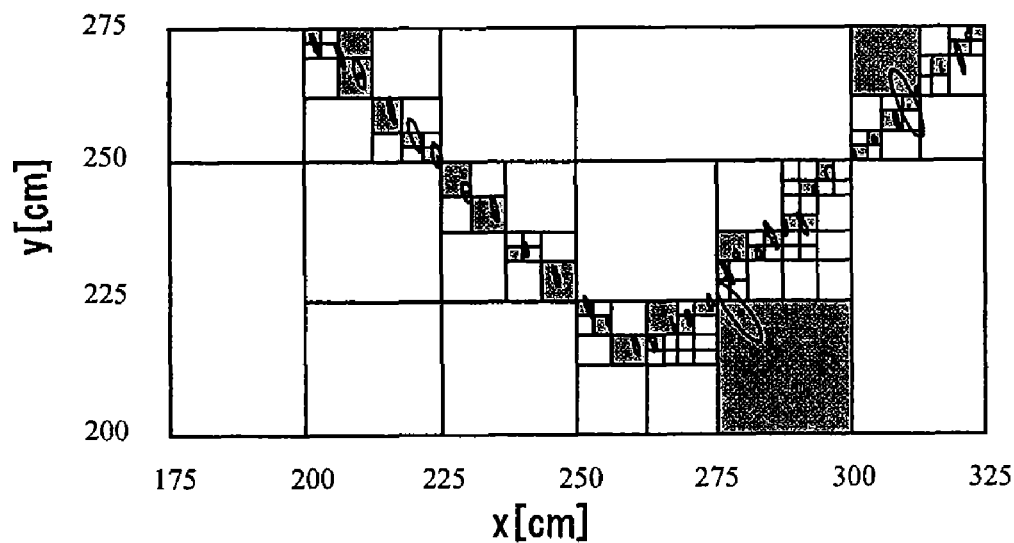
FIG. 16 is a partial expanded view of FIG. 15.

PPP FIG. 15 illustrates the result obtained through the model updating step using the Kalman filter. FIG. 16 is a partial expanded view of FIG. 15. In these figures, if the length of one side of an initial voxel is 100 cm, partitioning may be performed up to 6 times. In the area in which the object exists, as the results of repetitive repartitioning of voxels, the object is displayed with excellent accuracy. In regions wherein there is no object, the repartitioning of voxels is not performed, enabling the expression of the environment with the required and adequate data size. Moreover, error distributions of the representative points within the various voxels are small, and the environment map can be expressed with high accuracy. In this way, even if the data contains error, the results converge nicely due to the effect of the Kalman filter. Moreover, in this method the number of measured points can be increased to reduce the standard deviation, which can be expected to further increase the accuracy.

In addition, because the position and posture of the object to be measured are stationary, the updating can be performed independently of the position and posture of the object to be measured. Note that updating using the Kalman filter on only the representative points m (i) of the model point set for which correlations (or correspondence) have been established with the measured point sets obtained by the range sensor can greatly reduce the calculating amount.

In the fine matching step, a new measured data and error distribution are rotated and translated relative to the environment model for the previous measuring position, or an environment model for a new measurement position is rotated and translated relative to the environment model for the previous measuring position, in order to maximize the evaluation value (such as the multiplication of the degree of coincidence) of the degree of coincidence established through maximum likelihood estimates based on the distance between adjacent error distributions, instead of position matching so as to minimize the summation of the distances between adjacent error distributions.

This case will be explained in detail.

Because an error model is considered in both the model point set, which is the environment map (environment model), and the sensor measured point set, both errors can be used in the calculation formula (termed the "evaluation function," below) for the evaluation value (for example, the multiplication of the degree of coincidence) relating to the degree of coincidence. In the present embodiment, rather than simply creating a correlation with the nearest point, the concept of likelihood is incorporated to incorporate the error distribution in the environment map and the error distribution of the measured points into the evaluation function so as to determine the evaluation function such that where the probability of appearance of each measured point is at a maximum in the environment map at the current time point, the evaluation function will also be at a maximum.

Specifically, the position of the point $i=p(j)$ on the environment map that corresponds to the measured point $j$ is assumed to follow a normal distribution of the average value (representative point) m (i) and error covariance matrix $\Sigma_m(i)$, where the evaluation function is established in Equation 9, below, so that the result of measurement using three-dimensional LRF is that the probability value $Pr(L(j)|m(i), \Sigma_m(i))$ will be the evaluation function EM (i, j) for point i and point j, and the multiplication thereof will be maximized.

$$EM = \prod_{j=1}^{N} \{\omega(j)EM(i, j)\} \quad \text{(Equation 9)}$$

$$= \prod_{j=1}^{N} \{\omega(j)Pr(L(j) \mid m(P(j)), \Sigma_m(P(j)))\}$$

Note that $\omega(j)$ is 1 if there is a representative point that corresponds to the measured point j within the environment model, and 0 otherwise.

Here if the $Pr(L(j)|q)$ represents the value of probability value that the measured data being L(j) is obtained where the point on the environment map is at the position of q, and if $Pr(q|m(i), \Sigma_m(i))$ represents the value of the probability value that the point on the environment map is q, on the assumption that the average value m (i) and the error covariance matrix $\Sigma_m(i)$ follow a normal distribution, Equation 10 is established.

$$Pr(L(j)|m(i), \Sigma_m(i)) = \int \{Pr(L(i)|q) \cdot Pr(q|m(i), \Sigma_m(i))\} dq \quad \text{(Equation 10)}$$

When $Pr(q|m(i), \Sigma_m(i))$ is assumed to have a normal distribution, the result is the following Equation 11:

$$Pr(q \mid m(i), \Sigma_m(i)) = \frac{1}{\sqrt{2\pi}^3 \sqrt{|\Sigma m(i)|}} \exp\left(-\frac{1}{2}(q - m(i))^t \Sigma m(i)^{-1}(q - m(i))\right) \quad \text{(Equation 11)}$$

On the other hand, by substituting as $z(j)$ for $L(j)$, this $Pr(L(j)|q)$ can be approximated by the following Equation 12:

$$Pr(L(j) \mid q) \cong \frac{1}{\sqrt{2\pi}^3 \sqrt{|\Sigma z(j)|}} \exp\left(-\frac{1}{2}(z(j) - q)^t \Sigma z(j)^{-1}(z(j) - q)\right) \quad \text{(Equation 12)}$$

Figure 17:
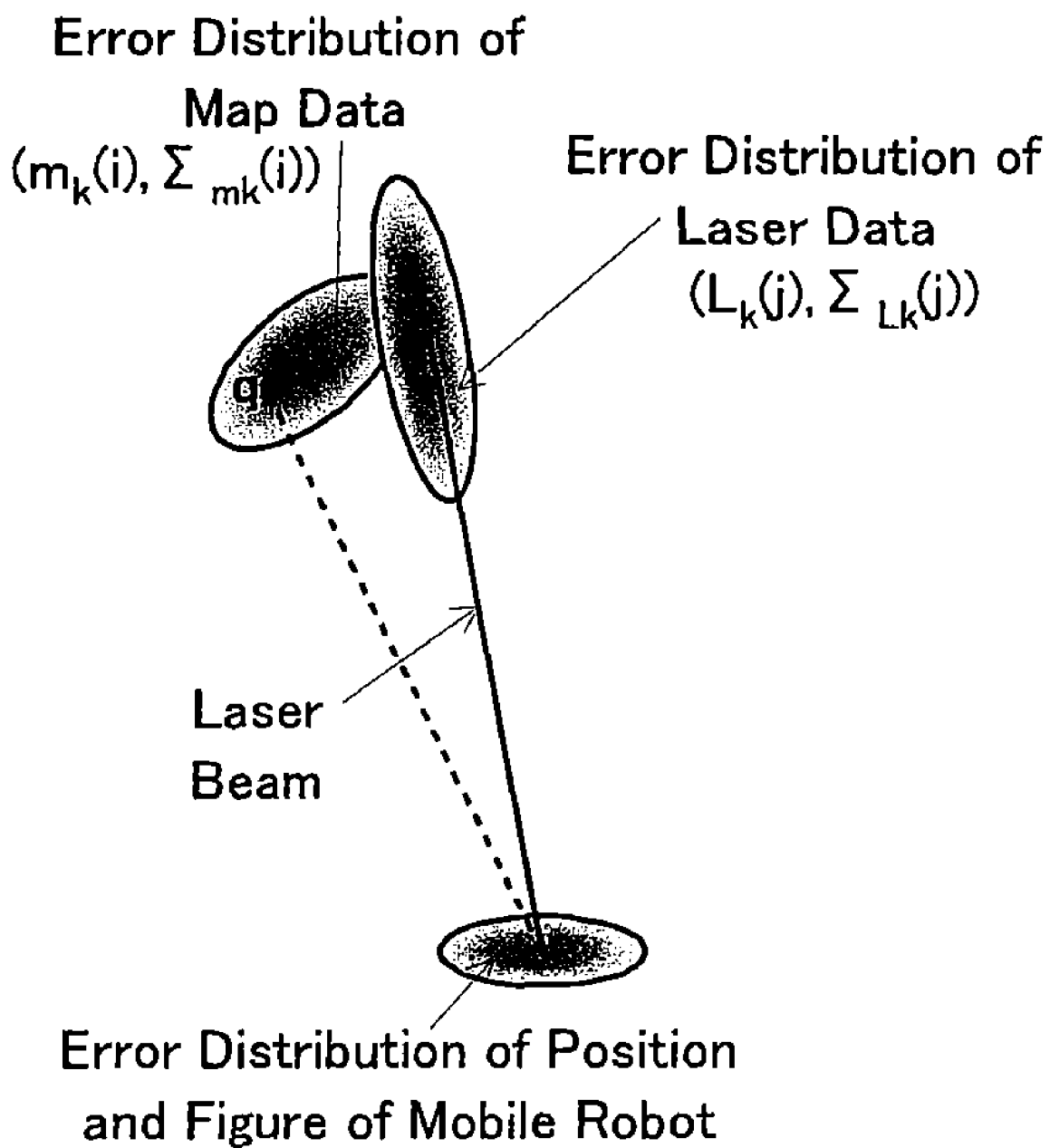
FIG. 17 illustrates a correlation taking error into account.

Here $z_k(j)$ is dependent on the position $t_r$ and orientation $R_r$ of the moving unit on which the range sensor is mounted. Actually, the direction of q and the direction of the measured point L (j), when viewed from the center of the sensor coordinates system of the three-dimensional LRF are different, as shown in FIG. 17, so it is also necessary to perform a rotational transformation on the error covariance matrix $\Sigma_z(j)$ to match the direction of q, but because the probability of the existence of q, which is at a location that is greatly separated from the point i on the environment map for which the correlation has been defined is low, the approximation can be considered to have adequate accuracy. Consequently, $Pr(L(j)|m(i), \Sigma_m(i))$ can be represented by the following Equation 13:

$$Pr(L(j) \mid m(i), \Sigma_m(i)) = \frac{1}{\sqrt{2\pi}^6 \sqrt{|\Sigma_z(j)\Sigma_m(i)|}} \times$$
$$\int \left\{ \exp\left(-\frac{1}{2}(z(j) - q)^t \Sigma z(j)^{-1}(z(j) - q)\right) \cdot \times \exp\left(-\frac{1}{2}(m(i) - q)^t \Sigma m(i)^{-1}(m(i) - q)\right) \right\} dq \quad \text{(Equation 13)}$$

The following Equation 14 can be obtained through a simple calculation:

$$Pr(L(j) \mid m(i), \Sigma_m(i)) = \frac{1}{\sqrt{2\pi}^6 \sqrt{|\Sigma_z(j)\Sigma_m(i)|}} \times \exp\left(-\frac{1}{2}\beta(j)\right) \times \quad \text{(Equation 14)}$$
$$\int \exp\left(-\frac{1}{2}(q - \alpha(j))^t (\Sigma z(j)^{-1} + \Sigma m(i)^{-1})(q - \alpha(j))\right) dq$$
$$= \frac{\sqrt{2\pi}^3 \sqrt{|(\Sigma_z(j)^{-1} + \Sigma_m(i)^{-1})^{-1}|}}{\sqrt{2\pi}^6 \sqrt{|\Sigma_z(j)\Sigma_m(i)|}} \exp\left(-\frac{1}{2}\beta(j)\right)$$
$$= \frac{1}{\sqrt{2\pi}^3 \sqrt{|\Sigma_z(j)\Sigma_m(i)|}} \exp\left(-\frac{1}{2}\beta(j)\right)$$

Notes that $\alpha(j)$ and $\beta(j)$ can be expressed by the following Equation 15:

$$\alpha(j) = (\Sigma_z(j)^{-1} + \Sigma_m(i)^{-1})^{-1} \times (\Sigma_m(i)^{-1} m(i) + \Sigma_z(j)^{-1} z(j))$$

$$\beta(j) = (m(i) - z(j))^t (\Sigma_z(j) + \Sigma_m(i))^{-1} (m(i) - z(j)) \quad \text{(Equation 15)}$$

Consequently, the evaluation function EM (i, j) that expresses the degree of coincidence for the correlation of point in the model point set and point j in the measured point set can be approximated to the value of the probability that z (j) is obtained in the normal distribution of the average value m (i) and the error covariance matrix $\Sigma_m(i) + \Sigma_z(j)$. The use of this evaluation function enables the definition of correlation taking into account error in both the environment map and the measured data.

An additional explanation will be given regarding establishing correlations between the measured points and the environment map (that is, the environment model). Because in the embodiment described above a statistical evaluation function that takes the error distribution into account is used, the corresponding point cannot be established without calculating the value of the evaluation function. Given this, the corresponding point is found based on the values of the evaluation function from candidates after narrowing in, in advance, on candidates to be correlated, from among the model point set on the environment map. Specifically, these may be performed as follows:

(1) The highest level of voxels that intercept the scope of the error covariance matrix $\Sigma_L(j)$ for the measurement point j of interest (a scope of, for example, 3× the standard deviation), and the highest level of voxels adjacent to those voxels, are calculated, and the representative points that exist within these voxels, including the voxels on lower levels, are defined as candidates for corresponding points. Because the voxels form a hierarchical structure, the retrieval of the candidate points is essentially without calculation amount. At this time, if there are no candidate representative points, then there are no corresponding points. The reason for adding the adjacent voxels to the candidates is because there are cases wherein, depending on the position of the representative point within the voxel, the scope of the error covariance matrix extends into the adjacent voxel.

(2) The representative point i and the error covariance matrix of the candidate voxel are used to calculate the value of the evaluation function EM (i, j).

(3) The representative point i with the maximum value for the evaluation function EM (i, j) is defined as the corresponding point. However, if the value of the evaluation function is less than a threshold value, it is defined as not having a corresponding point.

In the present embodiment, as the evaluation function EM (i, j) for defining correlation, an equation that is based on likelihood is used, and because there is statistically a clear decision scale relating to whether or not there is a corresponding point, there will not be forced correlation in the case wherein the corresponding point can be considered to be nonexistent. Note that when there is no corresponding point, the applicable (target) measured point is interpreted to be a point corresponding to a part that has not yet been measured, and is added to the environment map.

While in this embodiment a three-dimensional shape data position matching method and device were explained, the present invention can also be embodied as a two-dimensional shape data position matching method and device by viewing a two-dimensional shape as a special case of a three-dimensional shape.

Additionally, in the outputting step described above, the position of the voxel, the representative point, and the error distribution need not all be outputted, but rather, in, for example, a case wherein it is possible to understand the three-dimensional shape without all these, or when of these, only one or two are necessary, then at least one of the voxel position, the representative point, and the error distribution may be outputted to the outputting device.

Note that the present invention is not limited to the embodiments described above, but rather, of course, various modifications can be made without deviating from the intent of the present invention.

What is claimed is:

1. A three-dimensional shape data position matching method for measuring a static three-dimensional shape from a plurality of measuring positions, and for combining and position matching the distance data thereof, comprising:
 a data inputting step for inputting, into a computer, coordinate values on a three-dimensional shape at a new measuring position;
 a model structuring step for structuring an environment model that partitions a spatial region in which the three-dimensional shape exists, into a plurality of voxels formed from rectangular solids, of which the boundary surfaces are mutually perpendicular, and stores the positions of the individual voxels;
 a matching step for setting and recording a representative point and an error distribution thereof, within the voxel corresponding to the coordinate value;
 a fine matching step for position matching so as to minimize the summation of the distances between adjacent error distributions by rotating and translating a new measured data and error distribution, or rotating and translating an environment model for a new measuring position, relative to an environment model for a previous measuring position; and
 an outputting step for outputting, to an outputting device, the positions of the individual voxels, the representative point, and the error distribution.

2. The three-dimensional shape data position matching method as set forth in claim 1, comprising, in the matching step:
 adding a representative point and the error distribution thereof to the inside of a voxel; and
 setting and storing a probability value that expresses the probability of the existence of an object within the voxel.

3. The three-dimensional shape data position matching method as set forth in claim 1, comprising prior to the fine matching step:
 a rough matching step for position matching by rotating and translating a new measured data and error distribution relative to an environment model for an earlier measuring position so as to minimize the summation of the distances from measured data and error distributions to adjacent voxels having representative points, or rotating and translating an environment model for a new measuring position relative to the environment model for the earlier measuring position so as to minimize the summation of the distances between voxels having representative points.

4. The three-dimensional shape data position matching method as set forth in claim 1, comprising, prior to the fine matching step:
 a rough matching step for position matching by rotating and translating a new measured data and error distribution relative to an environment model for an earlier measuring position so as to maximize the summation of the probability values of voxels having representative points adjacent to measured data and error distributions, or rotating and translating an environment model for a new measuring position relative to the environment model for the earlier measuring position so as to minimize the summation of differences of the probability values of adjacent voxels.

5. The three-dimensional shape data position matching method as set forth in claim 1, comprising, after the data inputting step:
 a search scope limiting step for limiting a checking scope through estimating the current measuring position from the change in the measuring position of the past, or through obtaining the current measuring position from a sensor that is capable of obtaining the current measurement position, or through the use of a reflective strength value in addition to the distance value of the measured data.

6. The three-dimensional shape data position matching method as set forth in claim 1, comprising, in the fine matching step:
 treating as a single measurement point a case where error distributions intersect; and
 calculating the distance between error distributions by multiplying the distance value of this case by a weight calculated from the degrees of coincidence of the distributions.

7. The three-dimensional shape data position matching method as set forth in claim 1, comprising, in the model structuring step:
 if the largest voxel is set to a size corresponding to the minimum required resolution, and a plurality of measured points exists within a single voxel, further partitioning hierarchically the voxel into a plurality of voxels so that only a single measured point exists within a single voxel.

8. The three-dimensional shape data position matching method as set forth in claim 1, comprising, after the fine matching step:
 a model updating step for updating the environment model;
 in the model updating step, retrieving the voxel corresponding to the coordinate value of a newly inputted measured point; and
 assuming that no object exits between the origin and the measured point to reset or eliminate the representative points and error distributions within the voxels positioned therebetween.

9. The three-dimensional shape data position matching method as set forth in claim 1, comprising, after the fine matching step:
 a model updating step for updating the environment model;
 in the model updating step, retrieving the voxel corresponding to the coordinate value of a newly inputted measured point; and
 if there is no representative point within the voxel, setting the coordinate value and the error distribution as the coordinate value and error distribution of the representative point.

10. The three-dimensional shape data position matching method as set forth in claim 1, comprising, after the fine matching step, a model updating step for updating the environment model; wherein the model updating step comprises:
 retrieving the voxel corresponding to the coordinate value of a newly inputted measured point;
 if there is a representative point that has already been set within the voxel, comparing the newly obtained error distribution and the error distribution already set within the voxel;
 if the error distributions are mutually overlapping, resetting a new error distribution and a new representative point from both error distributions; and if the error distributions are not mutually overlapping, further partitioning hierarchically the voxel into a plurality of voxels so that only a single representative point exists within a single voxel.

11. The three-dimensional shape data position matching method as set forth in claim 10, comprising, in the model updating step:
comparing a newly obtained error distribution with an error distribution that has already been set within a voxel;
if the error distributions are mutually overlapping, and the new representative point moves to another voxel as the result of resetting a new error distribution and a new representative point from both error distributions, or from both error distributions and a representative point that has already been set within the voxel and a coordinate value of a newly inputted measured point,
if there is no representative point in the another voxel, then setting the new error distribution and new representative point in the voxel;
if a representative point has already been set in the another voxel, comparing the new error distribution and the error distribution that has already been set into the another voxel;
(A) if the error distributions are mutually overlapping, then resetting a new error distribution and a new representative point from both error distributions, or from both error distributions and the representative point that has already been set within the another voxel and a newly entered measured point coordinate value; and
(B) if the error distributions are not mutually overlapping, further partitioning hierarchically the voxel into a plurality of voxels so that only a single representative point exists within a single voxel.

12. The three-dimensional shape data position matching method as set forth in claim 1, comprising, after the fine matching step, a model updating step for updating the environment model; wherein the model updating step comprises:
obtaining and resetting a new representative point and error distribution through a Kalman filter from a coordinate value and error distribution of the newly inputted measured point, and from the representative point and the error distribution thereof that have already been set in the voxel.

13. A three-dimensional shape data position matching method for measuring a static three-dimensional shape from a plurality of measuring positions, and for combining and position matching the distance data thereof, comprising:
a data inputting step for inputting, into a computer, coordinate values on a three-dimensional shape at a new measuring position;
a model structuring step for structuring an environment model that partitions a spatial region in which the three-dimensional shape exists, into a plurality of voxels formed from rectangular solids, of which the boundary surfaces are mutually perpendicular, and stores the positions of the individual voxels;
a matching step for setting and recording a representative point and an error distribution thereof, within the voxel corresponding to the coordinate value;
a fine matching step for rotating and translating a new measured data and error distribution, or rotating and translating an environment model for a new measuring position, relative to an environment model of a previous measuring position, in order to maximize the evaluation value of the degree of coincidence determined by maximum likelihood estimate based on the adjacent error distributions; and
an outputting step for outputting to an outputting device, the positions of the individual voxels, the representative point, and the error distribution.

14. The three-dimensional shape data matching method as set forth in claim 13, wherein the equation for calculating the evaluation value of the degree of coincidence is expressed in the following Equation 16:

$$EM = \prod_{j=1}^{N} \{\omega(j) EM(i, j)\} \quad \text{(Equation 16)}$$

where, in this equation: a correlation is established between the measured points j and the representative points i in the environment model; the probability of obtaining measured data formed from the measurement point j is given by EM (i, j); $\omega(j)$ is if there is a representative point that corresponds to the measured point j within the environment model, and 0 otherwise.

15. A three-dimensional shape data position matching device for measuring a static three-dimensional shape from a plurality of measuring positions, and for combining and position matching the distance data thereof, comprising:
a data inputting device for inputting, into a computer, coordinate values on a three-dimensional shape;
a model structuring device for structuring an environment model that partitions a spatial region in which the three-dimensional shape exists, into a plurality of voxels formed from rectangular solids, of which the boundary surfaces are mutually perpendicular, and stores the positions of the individual voxels;
a matching device for setting and recording a representative point and an error distribution thereof, within a voxel corresponding to a coordinate value; and
a data transmitting device for outputting, to an outputting device, the voxel position, representative point, and error distribution,
performing position matching by rotating and translating an environment model for a new measuring position relative to the environment model for a previous measuring position so as to minimize the summation of the distances between adjacent error distributions.

16. A three-dimensional shape data position matching method for measuring a static three-dimensional shape from a plurality of measuring positions, and for combining and position matching the distance data thereof, comprising:
a data inputting step for inputting, into a computer, coordinate values on a three-dimensional shape at a new measurement position;
a model structuring step for structuring an environment model that partitions a spatial region in which the three-dimensional shape exists, into a plurality of voxels formed from rectangular solids, of which the boundary surfaces are mutually perpendicular, and stores the positions of the individual voxels;
a matching step for setting and recording a representative point and an error distribution thereof, within the voxel corresponding to the coordinate value;
a fine matching step for position matching so as to minimize an evaluation value regarding the distances between adjacent error distributions by rotating and translating a new measured data and error distribution, or rotating and translating an environment model for a new measuring position, relative to an environment model for a previous measurement position; and an outputting step for outputting, to an outputting device, at least one of the positions of the individual voxels, representative point, and error distribution.

17. The three-dimensional shape data position matching method as set forth in claim 16, comprising, prior to the fine matching step:
a rough matching step for position matching by rotating and translating a new measured data and error distribution relative to an environment model for an earlier measuring position so as to minimize an evaluation value regarding the distances from measured data and error distributions to adjacent voxels having representative points, or rotating and translating an environment model for a new measuring position relative to the environment model for the earlier measuring position so as to minimize an evaluation value regarding the distances between voxels having representative points.

18. The three-dimensional shape data position matching method as set forth in claim 16, comprising, prior to the fine matching step:
a rough matching step for position matching by rotating and translating a new measured data and error distribution relative to an environment model of an earlier measurement position so as to maximize an evaluation value for the probability values of voxels having representative points adjacent to measured data and error distributions, or rotating and translating an environment model for a new measurement position relative to the environment model of the earlier measurement position so as to minimize and evaluation value for the differences of the probability values of adjacent voxels.

19. A three-dimensional shape data position matching device for measuring a static three-dimensional shape from a plurality of measuring positions, and for combining and position matching the distance data thereof, comprising:
a data inputting device for inputting, into a computer, coordinate values on a three-dimensional shape;
a model structuring device for structuring an environment model that partitions a spatial region in which the three-dimensional shape exists, into a plurality of voxels formed from rectangular solids, of which the boundary surfaces are mutually perpendicular, and stores the positions of the individual voxels;
a matching device for setting and recording a representative point and an error distribution thereof, within a voxel corresponding to the coordinate value; and
a data transmitting device for outputting, to an outputting device, at least one of the voxel position, representative point, and error distribution,
performing position matching by rotating and translating an environment model for a new measuring position relative to an environment model of a previous measuring position so as to minimize an evaluation value regarding distances between adjacent error distributions.

* * * * *